(12) United States Patent
Yamada et al.

(10) Patent No.: US 7,076,135 B2
(45) Date of Patent: Jul. 11, 2006

(54) OPTICAL MODULE AND MANUFACTURING METHOD THEREFOR

(75) Inventors: Koji Yamada, Kanagawa (JP); Tai Tsuchizawa, Tokyo (JP); Shingo Uchiyama, Kanagawa (JP); Tetsufumi Shoji, Osaka (JP); Jyun-ichi Takahashi, Kanagawa (JP); Toshifumi Watanabe, Kanagawa (JP); Emi Tamechika, Kanagawa (JP); Hirofumi Morita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 33 days.

(21) Appl. No.: 10/666,482

(22) Filed: Sep. 18, 2003

(65) Prior Publication Data

US 2004/0057667 A1    Mar. 25, 2004

(30) Foreign Application Priority Data

| Sep. 20, 2002 | (JP) | ............................. 2002-275216 |
| Oct. 3, 2002 | (JP) | ............................. 2002-290775 |
| Oct. 7, 2002 | (JP) | ............................. 2002-293457 |
| Oct. 17, 2002 | (JP) | ............................. 2002-302960 |
| Nov. 20, 2002 | (JP) | ............................. 2002-336135 |

(51) Int. Cl.
*G02B 6/26* (2006.01)
*G02B 6/42* (2006.01)
*G02B 6/10* (2006.01)

(52) U.S. Cl. .................. 385/43; 385/50; 385/129; 385/131

(58) Field of Classification Search ............. 385/28–43
See application file for complete search history.

(56) References Cited

U.S. PATENT DOCUMENTS

| 6,396,984 B1 * | 5/2002 | Cho et al. .................. 385/43 |
| 2002/0085602 A1 | 7/2002 | Park et al. |
| 2003/0044118 A1 * | 3/2003 | Zhou et al. ................. 385/43 |

FOREIGN PATENT DOCUMENTS

JP            61041107            2/1986

(Continued)

OTHER PUBLICATIONS

Yoshimoto et al., Highly efficient coupling semiconductor spot-size converter with an InP/InAlAs multiple-quantum-well core, Feb. 20, 1995, Applied Optics, vol. 34, No. 6, pp. 1007-1014.*

(Continued)

*Primary Examiner*—Frank G. Font
*Assistant Examiner*—Erin D. Chiem
(74) *Attorney, Agent, or Firm*—Blakely Sokoloff Taylor & Zafman

(57) ABSTRACT

An optical module includes an under cladding, a first core, a second core, and an over cladding. The under cladding has a flat shape as a whole. The first core has a quadrangular cross section and is placed on the under cladding. The second core is placed on a terminal end portion of the first core. The over cladding is placed in a region including the terminal end portion of the first core and the second core placed on the terminal end portion of the first core. The under cladding and the first core placed thereon constitute a first optical waveguide. The under cladding, the terminal end portion of the first core placed on the under cladding, the second core placed thereon, and the over cladding placed on and around the second core constitute a mode field size conversion portion. The under cladding, the second core placed on the under cladding, and the over cladding placed on and around the second core constitute a second optical waveguide. The first core is made of silicon. The first and second cores differ in cross-sectional shape. A manufacturing method for the optical module is also disclosed.

13 Claims, 26 Drawing Sheets

FOREIGN PATENT DOCUMENTS

| | | |
|---|---|---|
| JP | 01-196005 | 8/1989 |
| JP | 02-163706 | 6/1990 |
| JP | 04283704 | 10/1992 |
| JP | 06174982 | 6/1994 |
| JP | 07-110415 | 4/1995 |
| JP | 10-122341 A | 5/1998 |
| JP | 10-123341 | 5/1998 |
| JP | 10-160976 | 6/1998 |
| JP | 2001-051144 | 2/2001 |
| JP | 2001033642 | 2/2001 |
| JP | 2002-122750 A | 4/2002 |
| JP | 05249331 | 9/2003 |
| JP | 2004-503800 | 2/2004 |
| JP | 2004-85868 | 3/2004 |
| WO | WO 02/05000 | 6/2001 |
| WO | WO 02/063347 | 10/2001 |
| WO | WO 02/25337 | 3/2002 |
| WO | WO02/063347 | 8/2002 |

OTHER PUBLICATIONS

"Highly effiecient coupling semiconductor spot-size converter with an InP/InAIAs multiple-quantum-well core", N. Yoshimoto, et al., Applied Optics, vol. 34, No. 6 Feb. 20, 1995, p. 1007-1014.

Shoji et al., "Optical International Structure of Si Waveguide on SOI Substrate", Extended Abstract (the 48 Spring Meeting, 2001) No. 3, The Japan Society of Applied Physics and Related Societies (30a-YK-11).

Lee et al., "Fabricatio of ultralow-loss Si/SiO$_2$ waveguites by roughnesws Reduction", OPTICS LETTERS, vol. 26, No. 23, Dec. 1, 2001, Optical Society of America, pp. 1888-1890.

Rickman et al., "Silicon-on-Insulator Optical Rib Waveguide Loss and Mode Characteristics", Journal of Sightwave Techonology, vol. 12, No. 10, Oct. 1994, IEEE, pp. 1771-1776.

Lee et al., "Effect of size and roughness on light transmission in a Si/SiO$_2$ waveguide: Experiments and model", Applied Physics Letters, vol. 77, No. 11, Sep. 11, 2000, American Institute of Physics, pp. 1617-1619.

Sakai et al., "Propagation Characteristics of Ultrahigh-Δ Optical Waveguide on Silicon-on Insulator Substrate", Jpn. J. Appl. Phys., vol. 40, Part 2, No. 4B, Apr. 15, 2001, p. L383-L385.

Yemada et al., "SOI-based Photonic Crystal Line-Defect Waveguides", Invited Paper of Active and Passive Optical Components for WDM Communications II, Proceedings of SPIE, vol. 4870 (2002).

"Optical Interconnecting Structure of SI Waveguide on SOI Substrate"; T. Shoji, et al., NTT Telecommunications Energy Labs, one page (w/English abstract).

"0.1 dB/cm Waveguide Losses in Single-Mode SOI Rib Waveguides"; U. Fischer, et al., IEEE Photonics Technology Letters, 2 pages, May 1996.

* cited by examiner

FIG. 15G
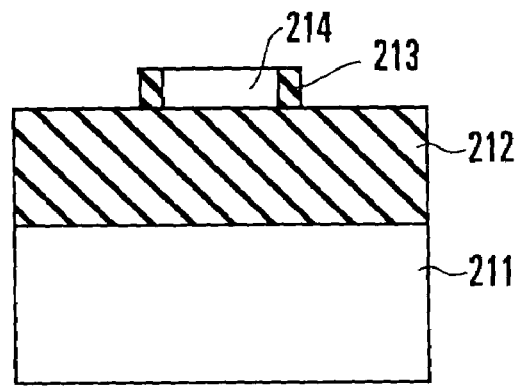
FIG. 15H
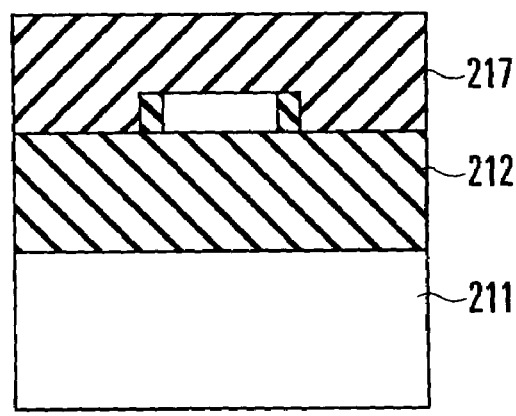
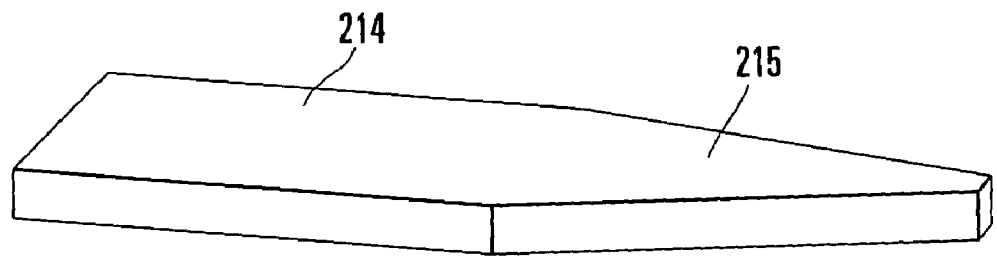
FIG. 16

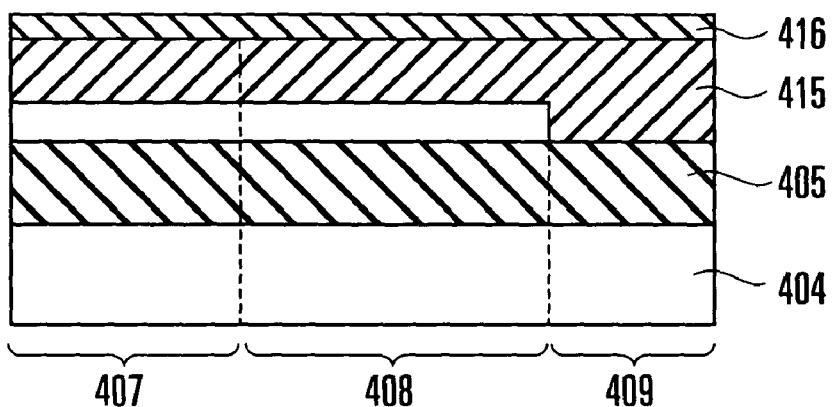
F I G. 23F
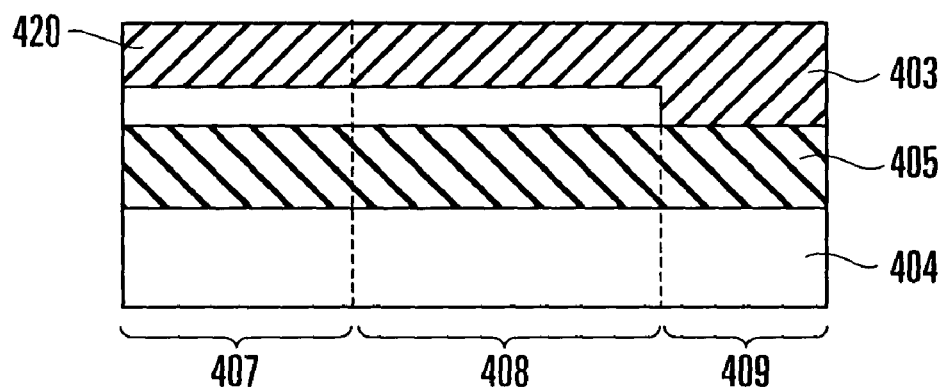
F I G. 23G
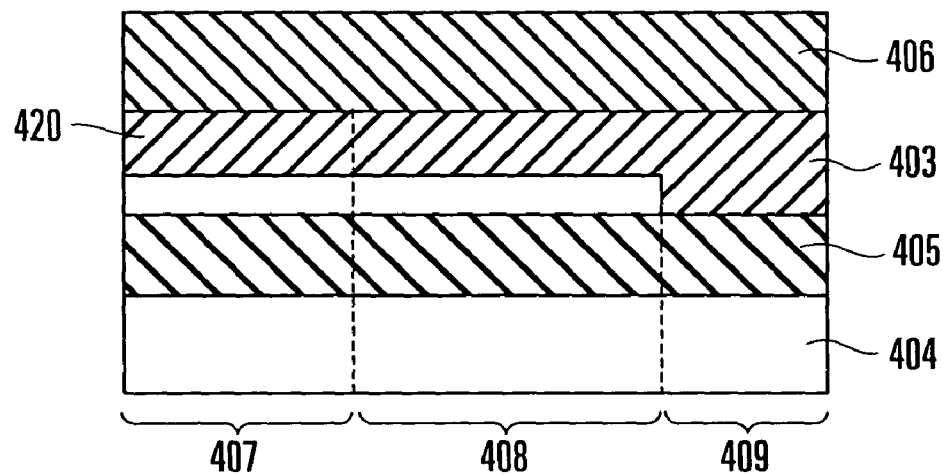
F I G. 23H

OPTICAL MODULE AND MANUFACTURING METHOD THEREFOR

BACKGROUND OF THE INVENTION

The present invention relates to an optical module used in the optoelectronic field and optical communication field, and a manufacturing method for the optical module.

Recently, for miniaturizing optical circuits, various researches and developments have been conducted on silicon wire optical waveguides using SOI (Silicon On Insulator) substrates and photonic crystal waveguides. Problems are posed in connection between these optical waveguides and optical fibers, light-emitting devices, light-receiving devices, and the like in terms of the respective mode field sizes (diameters). These optical waveguides have mode field sizes on the submicron order, whereas optical fibers and the like have mode field sizes on the order of several microns. It is therefore difficult to efficiently make direct connection between an optical waveguide and a general optical fiber or the like having a large mode field size. In order to connect them with a low loss, a mode field size must be converted.

For this purpose, various kinds of mode field size conversion structures have been proposed. For example, on an SOI substrate on which the first optical waveguide formed from a silicon wire is formed, the second optical waveguide made of a quartz-based material or polymer which is to be connected to the first optical waveguide is formed, and the second optical waveguide and the first optical waveguide having a tapered distal end are made to overlap each other, thereby realizing high-efficiency mode field size conversion (for example, T. Shoji et al, "Optical Interconnecting Structure of Si Waveguide on SOI Substrate", 30a-YK-11 Extended No. 3 Abstracts (The 48th Spring Meeting, 2001), The Japan Society of Applied Physics and Related Societies).

FIGS. 25A and 25B show a conventional optical waveguide having a mode field size (spot size) conversion structure. Referring to FIGS. 25A and 25B, reference numeral 10 denotes a first optical waveguide formed from a silicon wire; 11, a mode field size conversion structure; 12, a second optical waveguide connected to the first optical waveguide; 13, a silicon substrate; 14, an under cladding made of silicon oxide and formed on the silicon substrate 13; 16, a wire-like core made of silicon and formed on the under cladding 14; 17, a tapered portion which is made of silicon and extends from the core 16; and 18, a core made of a polymer and placed on the tapered portion 17. The core 16, tapered portion 17, and core 18 are arranged on the silicon substrate 13 and under cladding 14 as a common substrate, thereby connecting the first optical waveguide 10 to the second optical waveguide 12 through the mode field size conversion structure 11.

When light in the 1.55-µm band, which is used most for optical communication, is to be passed, the height and width of a cross section of the core 17 constituting the first optical waveguide 10 are about 0.3 µm each. The core 18 of the second optical waveguide 12 which is connected to the first optical waveguide 10 has a refractive index higher than the under cladding 14 by few %. Both the height and width of a cross section of the core 18 are about several µm. Reference numeral 16 denotes the core made of silicon and having the tapered portion 17. This core has a length of 200 µm, and the width of the tapered distal end portion is 0.06 µm. The core 16 and tapered portion 17 are formed by electron beam lithography and etching. The core 18 made of a polymer is formed by photolithography.

In order to connect an optical fiber to the conventional optical module shown in FIGS. 25A and 25B with a low loss, a mode field diameter F of the second optical waveguide to be connected to the first optical waveguide in the form of a wire is required to be near the mode field diameter (9 µm) of the optical fiber.

In the conventional optical module shown in FIGS. 25A and 25B, however, since air having a refractive index of 1 serves as an over cladding, the refractive index difference between the air and the core 18 of the second optical waveguide 12 is large. For this reason, the core size of the second optical waveguide 12 which satisfies the single mode condition cannot be larger than 3 µm square.

In addition, since there is no over cladding layer around the core 16 of the first optical waveguide 10 made of a silicon wire, the core 16 of the optical waveguide 10 tends to be damaged, resulting in an increase in propagation loss.

In the optical module shown in FIGS. 25A and 25B, in order to improve the mode field size conversion efficiency, the width of the tapered distal end is required to be 0.1 µm or less, ideally about 0.06 µm. Such micro fabrication demands highly sophisticated lithographic techniques such as electron beam drawing and etching techniques. It is therefore difficult to economically process tapered portions.

SUMMARY OF THE INVENTION

It is, therefore, a principal object of the present invention to provide an optical module which can realize light propagation between optical waveguides having different mode field sizes with high efficiency, and a manufacturing method for the optical module.

It is another object of the present invention, in addition to the principal object, to provide an optical module which can reduce a connection loss more than the prior art, and a manufacturing method for the optical module.

It is still another object of the present invention to provide a manufacturing method for an optical module, which can manufacture an optical module with higher precision and a smaller number of steps than in the prior art.

It is still another object of the present invention to provide a manufacturing method for an optical module with a high degree of margin for processing.

It is still another object of the present invention to provide a manufacturing method for an optical module, which can manufacture an optical module without damaging a previously formed portion.

In order to achieve the above objects, according to the present invention, there is provided an optical module comprising an under cladding having a flat shape as a whole, a first core which has a quadrangular cross section and is placed on the under cladding, a second core placed on a terminal end portion of the first core, and an over cladding placed in a region including the terminal end portion of the first core and the second core placed on the terminal end portion of the first core, wherein the under cladding and the first core placed thereon constitute a first optical waveguide, the under cladding, the terminal end portion of the first core placed on the under cladding, the second core placed thereon, and the over cladding placed on and around the second core constitute a mode field size conversion portion, the under cladding, the second core placed on the under cladding, and the over cladding placed on and around the second core constitute a second optical waveguide, the first core is made of silicon, and the first and second cores differ in cross-sectional shape.

BRIEF DESCRIPTION OF THE DRAWINGS

FIGS. 1A and 1B show the basic concept of an optical module according to the present invention, in which FIG. 1A is a plan view, and FIG. 1B is a sectional view taken along the line 1B—1B in FIG. 1A;

FIGS. 3A to 3C shows an optical module according to the first embodiment of the present invention, in which FIG. 3A is a plan view, FIG. 3B is a sectional view taken along the line 3B—3B in FIG. 3A, and FIG. 3C is a sectional view taken along the line 3C—3C in FIG. 3A;

FIGS. 7A to 7C show an optical module according to the second embodiment of the present invention, in which FIG. 7A is a plan view, FIG. 7B is a sectional view taken along the line 7B—7B in FIG. 7A, and FIG. 7C is a sectional view taken along a line 7C—7C in FIG. 7A;

FIGS. 9A to 9C show an optical module according to the third embodiment of the present invention, in which FIG. 9A is a plan view, FIG. 9B is a sectional view taken along a line 9B—9B in FIG. 9A, and FIG. 9C is a sectional view taken along the line 9C—9C in FIG. 9A;

FIGS. 14A to 14C show an optical module according to the fourth embodiment of the present invention, in which FIG. 14A is a plan view, FIG. 14B is a sectional view taken along the line 14B—14B in FIG. 14A, and FIG. 14C is a sectional view taken along the line 14C—14C in FIG. 14A;

FIGS. 15A to 15H are views showing the steps in a manufacturing method for the optical module according to the fourth embodiment shown in FIGS. 14A to 14C;

FIG. 16 is a perspective view of the core of the first optical waveguide, which is made of silicon, and the tapered portion of the mode field size conversion portion continuous with the core according to the fourth embodiment;

FIGS. 19A and 19B show an optical module according to the fifth embodiment of the present invention, in which FIG. 19A is a cross-sectional view, and FIG. 19B is a longitudinal sectional view;

FIGS. 21A to 21E show an optical module according to the sixth embodiment of the present invention, in which FIG. 21A is a plan view, FIG. 21B is a sectional view taken along the line 21B—21B in FIG. 21A, FIG. 21C is a sectional view taken along the line 21C—21C in FIG. 21A, FIG. 21D is a sectional view taken along the line 21D—21D in FIG. 21A, and FIG. 21E is a sectional view taken along the line 21E—21E in FIG. 21A;

FIGS. 23A to 23H are views showing the steps in a manufacturing method for the main part of the optical module according to the seventh embodiment shown in FIGS. 21A to 21E;

FIGS. 24A to 24C show an optical module according to the eighth embodiment of the present invention, in which FIG. 24A is a plan view, FIG. 24B is a sectional view taken along the line 24B—24B in FIG. 24A, and FIG. 24C is a sectional view taken along the line 24C—24C in FIG. 24A; and FIGS. 25A and 25B show an example of a conventional optical module, in which FIG. 25A is a plan view, and FIG. 25B is a sectional view.

DESCRIPTION OF THE PREFERRED EMBODIMENTS

Figure 1A:
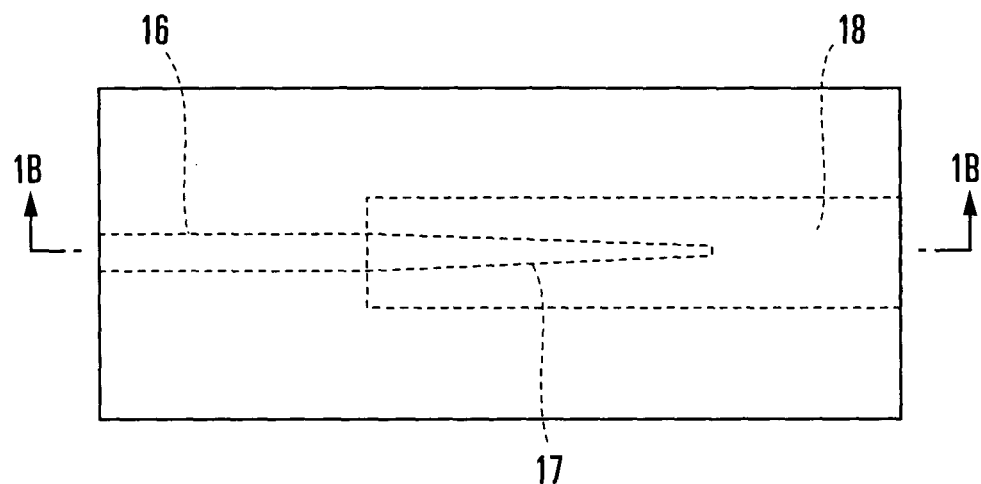

The present invention will be described below with reference to the accompanying drawings. Note that the sizes and shapes of the respective constituent elements in the drawings and their positional relationships are approximated to the extent that the present invention can be understood. In addition, each numerical condition to be described below is merely an example.

(Basic Concept of Present Invention)

Figure 1B:
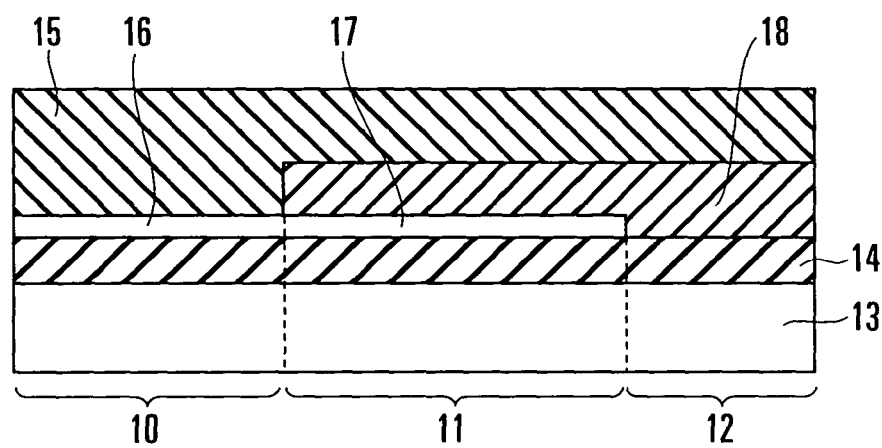

FIGS. 1A and 1B show an optical module having a mode field size conversion portion according to the present invention. Referring to FIGS. 1A and 1B, reference numeral 10 denotes a first optical waveguide; 11, a mode field size conversion portion; 12, a second optical waveguide connected to the first optical waveguide 10; 13, a silicon substrate; 14, an under cladding formed from a silicon oxide film formed on the silicon substrate; and 15, an over cladding made of a material such as a polymer, which is a characteristic portion of the present invention. Reference numeral 16 denotes a first core in the form of a wire which is formed on the under cladding 14; 17, a tapered portion which is made of silicon and serves as a terminal end portion of the first core 16; and 18, a second core which is made of a polymer and at least partly located on the tapered portion 17 of the first core 16. The main portion of the second core 18, the over cladding 15, and the under cladding 14 constitute the second optical waveguide. The tapered portion 17 is formed such that its cross-sectional area gradually decreases toward the distal end of the first core 16.

The first optical waveguide 10 and second optical waveguide 12 are formed by using the silicon substrate 13 and under cladding 14 as common substrates and optically connected to each other through the mode field size conversion portion 11.

The mode field size conversion portion 11 is constituted by the under cladding 14, the tapered portion 17, the second core 18 placed on the tapered portion 17, and the over cladding 15 placed on and around the second core. The first optical waveguide 10 is constituted by the under cladding 14 and the first core 16 and over cladding 15 which are placed on the under cladding. The first optical waveguide 10 does not necessarily require the over cladding 15.

When light in the 1.55-μm band, which is used most for optical communication, is to be passed, the height and width of a cross section of the first core 16 of the first optical waveguide 10 are about 0.3 μm each. The second core 18 of the second optical waveguide 12 has a refractive index higher than either of the under cladding 14 and the over cladding 15 by few %. Both the height and width of a cross section of the second core 18 are about several μm. The tapered portion 17 has a length of 300 μm, and the width of the tapered distal end portion is 0.06 μm. The over cladding 15 common to the first optical waveguide 10, mode field size conversion portion 11, and second optical waveguide 12 has a refractive index almost equal to or higher than that of the under cladding 14. The first core 16 and tapered portion 17 are formed by electron beam lithography and etching. The second core 18 is formed by photolithography and etching.

A manufacturing method for the optical module shown in FIGS. 1A and 1B will be described next with reference to FIGS. 2A to 2G.

Figure 2A:
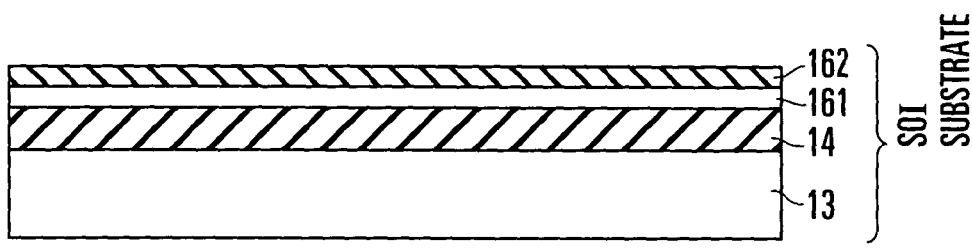
FIGS. 2A to 2G are views showing the steps in a manufacturing method for the optical module shown in FIGS. 1A and 1B.

First of all, there is prepared an SOI substrate constituted by the silicon substrate 13, the under cladding 14 which is flat-shaped as a whole, made of a silicon oxide film, and formed on the silicon substrate 13, and a silicon layer 161 formed on the under cladding 14. A silicon oxide film 162 serving as an etching mask is formed on the silicon layer 161 by, for example, chemical vapor deposition or sputtering (FIG. 2A). In this case, the under cladding 14 has a thickness of 3.0 μm, and the silicon layer 161 has a thickness of 0.2 μm to 0.5 μm.

Figure 2B:
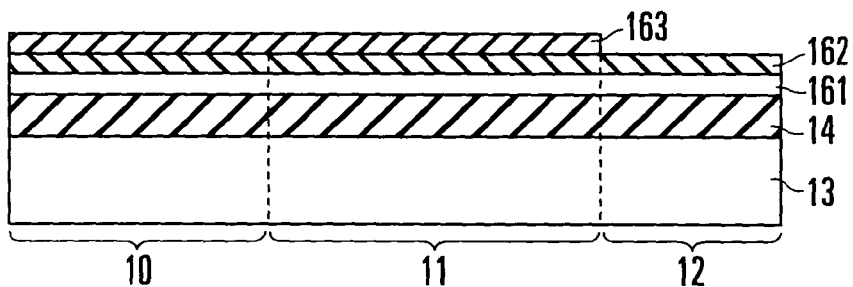

Subsequently, after the upper surface of the silicon oxide film 162 is coated with an electron beam resist, the resist is processed by electron beam lithography to form a resist mask 163 for the formation of a silicon oxide film pattern (FIG. 2B). The resist mask 163 is used to form an etching mask by processing the silicon oxide film 162. The silicon layer 161 is processed by using this mask to form the core 16 of the first optical waveguide 10, which has a quadrangular cross section, and the tapered portion 17 serving as the terminal end portion of the core. After this formation, the flat shape of the core 16 of the first optical waveguide and tapered portion 17 is the same as that of the resist mask 163.

Figure 2C:
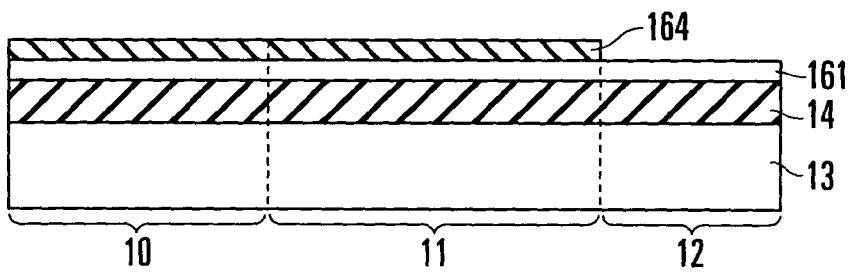
Figure 2D:
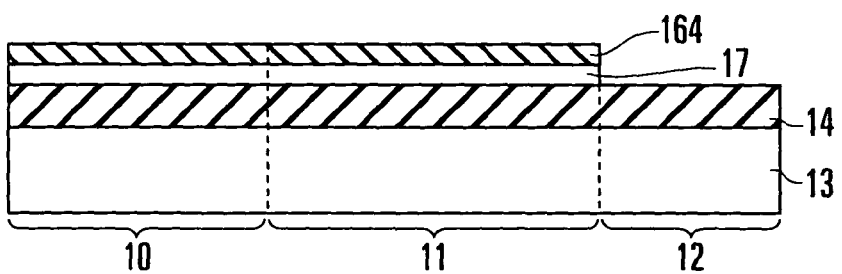
Figure 2E:
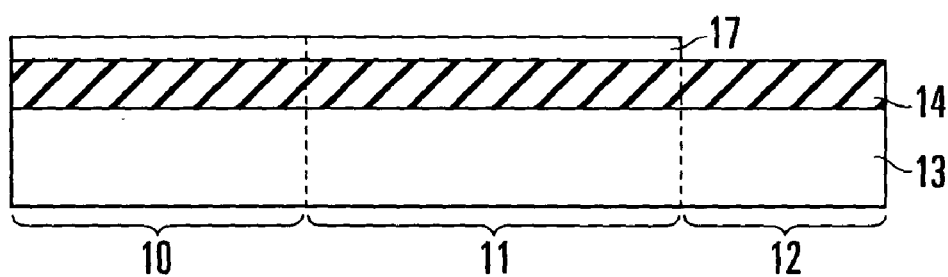

The silicon oxide film 162 is then etched by using the resist mask 163 to form a mask 163 for etching the first core 16 and tapered portion 17. Thereafter, the resist mask 163 is removed by ashing (FIG. 2C). The silicon layer 161 is etched by using the mask 164 to form the first core 16 of the wire-like first optical waveguide 10 and the tapered portion 17 (FIG. 2D). The mask 164 is then removed by wet etching (FIG. 2E). In this case, if the mask 164 is thin, it may be left without being removed because it has no influence.

Figure 2F:
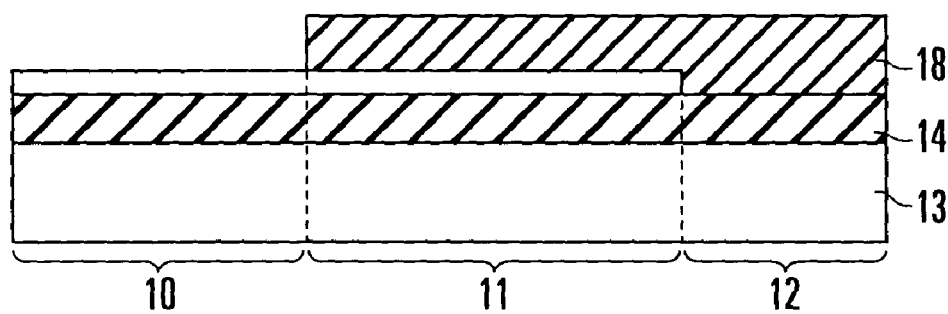

A silicon oxide film or polymer-based material having a higher refractive index than the under cladding 14 by about 2% is deposited to about 3.5 μm on the SOI substrate on which the first core 16 and tapered portion 17 are formed, by, for example, chemical vapor deposition or spin coating. This polymer-based material is processed by photolithography and etching to form the mode field size conversion portion 11 and the core 18 of the optical waveguide 12 (FIG. 2F).

Figure 2G:
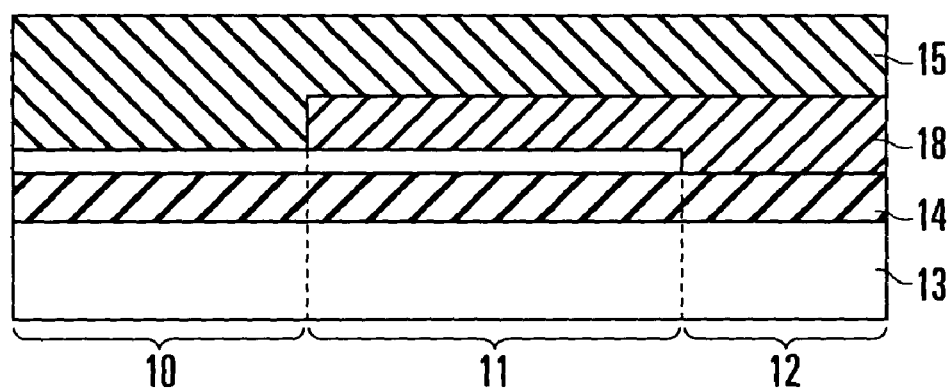

Finally, a silicon oxide film or polymer-based material having the same refractive index as that of the under cladding 14 is deposited to 6 μm or more on the SOI substrate on which the first core 16, tapered portion 17, and second core 18 are formed, thereby forming the over cladding 15 (FIG. 2G). In this manner, the optical module shown in FIGS. 1A and 1B is completed. In this case, a polymer having a higher refractive index than the under cladding and over cladding by about 2% is used for the core of the second optical waveguide. If a polymer exhibiting a smaller index difference is used, the core size of the second optical waveguide can be further increased.

In this case, since the over cladding made of a polymer having a refractive index similar to that of the under cladding is formed on the first core of the first optical waveguide and the second core of the second optical waveguide, the cores are protected from damage. In addition, since confinement of light in the second optical waveguide can be adjusted by the refractive index of the over cladding, the second core of the second optical waveguide can be further increased in size. This makes it possible to use the optical waveguides of this optical module stably for a long period of time and further decrease the connection loss with respect to the optical fiber.

(First Embodiment)

Figure 3A:
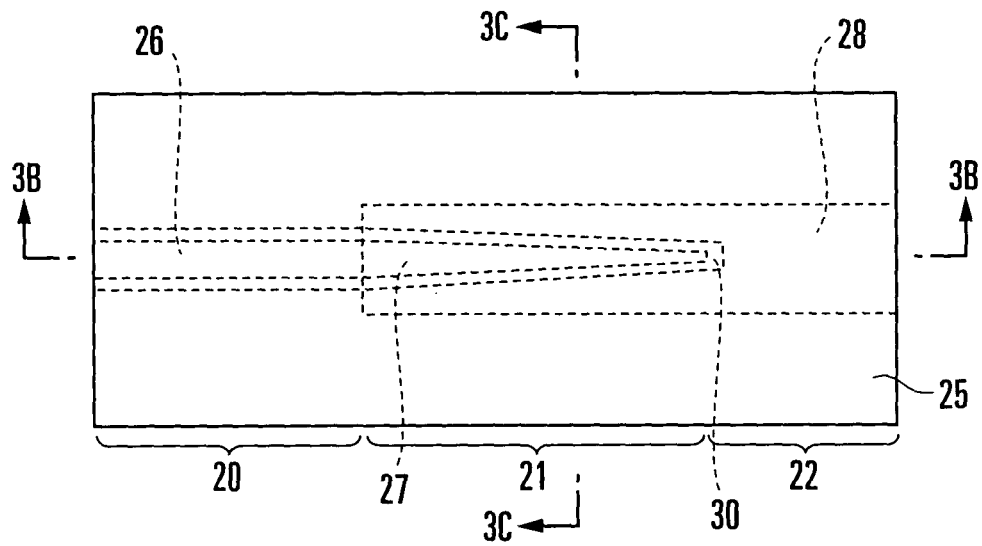
Figure 3B:
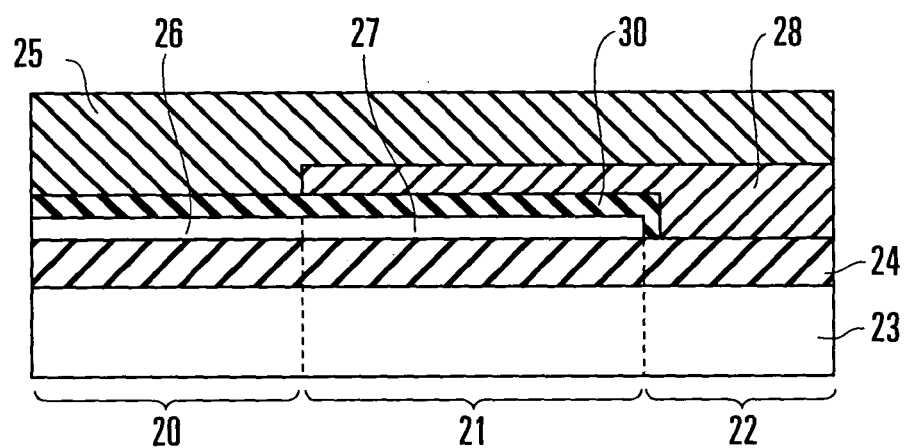
Figure 3C:
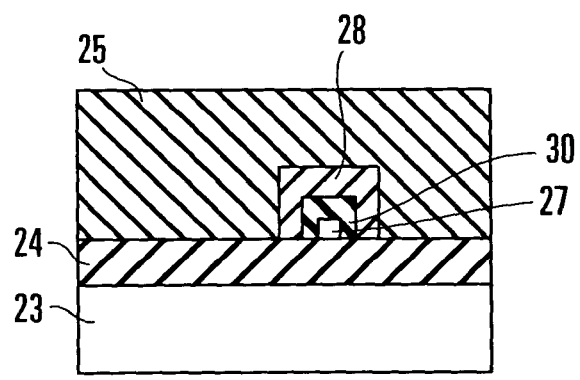

FIGS. 3A to 3C show an optical module according to the first embodiment of the present invention. Referring to FIGS. 3A to 3C, reference numeral 20 denotes a wire-like first optical waveguide made of silicon; 21, a mode field size conversion portion; 22, a second optical waveguide connected to the first optical waveguide 20; 23, a silicon substrate; 24, an under cladding formed from a silicon oxide film and placed on the silicon substrate 23; 25, an over cladding made of a polymer; 26, a first core which is made of silicon and forms the first optical waveguide 20; 27, a tapered portion which is made of silicon like the first core 26 and formed such that the width dimension decreases toward its distal end while the height of a cross section (thickness) of the core 26 is kept unchanged; 28, a second core which is made of a polymer and formed as the core of the mode field size conversion portion 21 and second optical waveguide 22; and 30, a silicon oxide film.

The tapered portion 27 is covered with the second core 28, together with the silicon oxide film 30 formed on the surface of the tapered portion 27, while the tapered portion is inserted into the second core 28 from its end face. The section where the tapered portion 27 placed along the axis of the first core 26 of the first optical waveguide is in contact with the second core 28 through the silicon oxide film 30 corresponds to the mode field size conversion portion 21. In this case, the tapered portion 27 is optically coupled to the second core 28 through the silicon oxide film 30. The tapered portion 27 and second core 28 are preferably positioned such that their axes coincide with each other. However, they need not be precisely aligned with each other as long as the tapered portion 27 is accommodated within the width of the second core 28. In this case, it suffices if the second core 28 is mounted on part of the tapered portion 27.

The propagation state of light in the optical module shown in FIGS. 3A to 3C will be described next. Light incident from the left end face of the core 26 of the silicon wire optical waveguide 20 shown in FIGS. 3A and 3B propagates through the core 26 and reaches the left end position of the tapered portion 27. As the light propagates through the tapered portion 27 to the right in FIG. 3A, the core width gradually decreases, and the confinement of the light weakens. As a result, the mode field size tries to increase circumferentially. At this time, however, since the second core 28 higher in refractive index than the under cladding 24 exists adjacent to the tapered portion 27, the optical power distribution gradually shifts from the first core 26 of the first optical waveguide 20 to the second core 28 of the second optical waveguide 22.

In contrast to the above case, when light is incident from the right end portion of the second core 28 shown in FIGS. 3A and 3B, the light distribution moves to the first core 26 of the first optical waveguide 20 through the second core 28 and tapered portion 27 as the light travels from the right to the left. Since this movement is adiabatically done through the tapered portion, its efficiency is very high.

Connecting the first core 26 of the first optical waveguide 20 to the second core 28 of the second optical waveguide 22 through the tapered portion 27 in this manner makes it possible to realize high-efficiency mode field size conversion.

A manufacturing method for the optical module shown in FIGS. 3A to 3C will be described next with reference to FIGS. 4A to 4H.

Figure 4A:
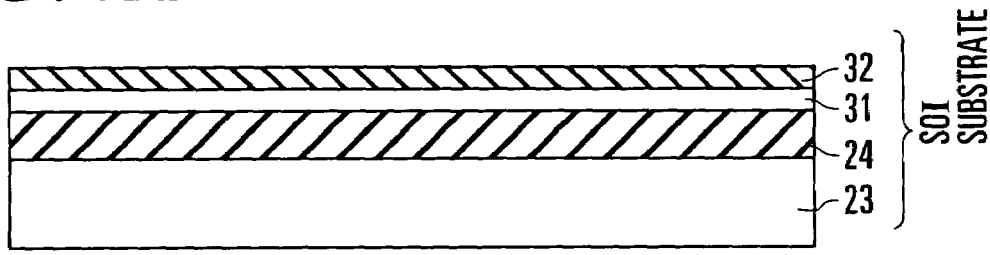
FIGS. 4A to 4H are views showing the steps in a manufacturing method for the optical module of the first embodiment shown in FIGS. 3A to 3C.

First of all, there is prepared an SOI substrate constituted by the silicon substrate 23, the under cladding 24 which is flat-shaped as a whole, made of a silicon oxide film, and formed on the silicon substrate 23, and a silicon layer 31 formed on the under cladding 24. A silicon oxide film 32 serving as an etching mask is formed on the silicon layer 31 by, for example, chemical vapor deposition or sputtering (FIG. 4A). In this case, the under cladding 24 has a thickness of 3.0 µm, and the silicon layer 31 has a thickness of 0.2 µm to 0.5 µm.

Figure 4B:
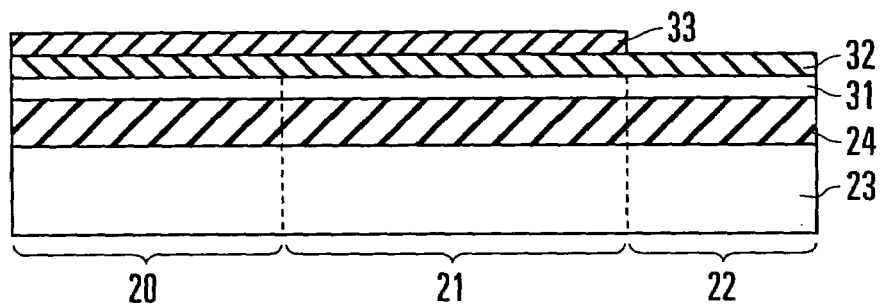

Subsequently, after the upper surface of the silicon oxide film 32 is coated with an electron beam resist, the resist is processed by electron beam lithography to form a resist mask 33 for the formation of a silicon oxide film pattern (FIG. 4B). The resist mask 33 is used to form an etching mask by processing the silicon oxide film 32. The silicon layer 31 is processed by using this mask to form the core 26 of the first optical waveguide 20, which has a quadrangular cross section, and the tapered portion 27 serving as the terminal end portion of the core. After this formation, the flat shape of the core 26 of the first optical waveguide and tapered portion 27 is the same as that of the resist mask 33.

Figure 5:
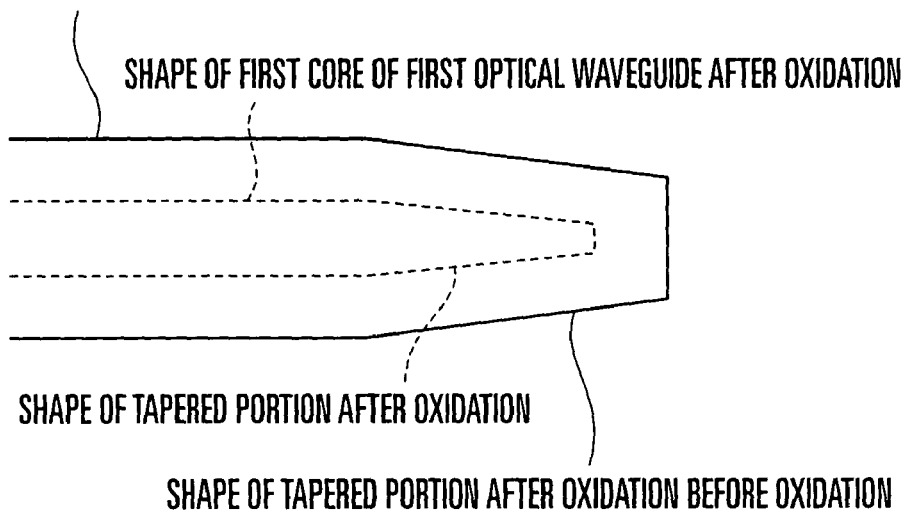
FIG. 5 is a view showing an example of an optical module to explain in detail part of the manufacturing method for the optical module shown in FIGS. 4A to 4H.
Figure 6:
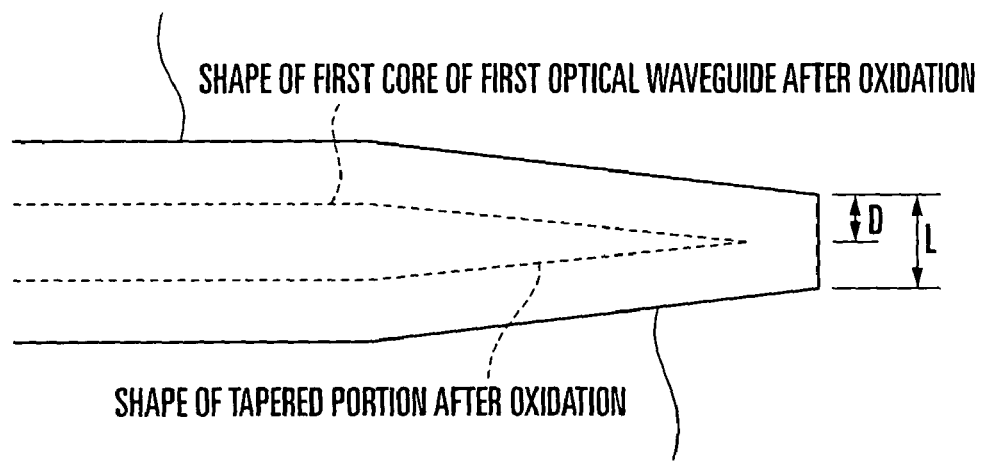
FIG. 6 is a view showing another example of the optical module to explain in detail part of the manufacturing method for the optical module shown in FIGS. 4A to 4H.

After the formation of the first core 26 and tapered portion 27, each of which has a cross-sectional shape, the width of the silicon layer is reduced in an oxidation process (to be described later). As shown in FIG. 5, therefore, the widths of the first core 26 and tapered portion 27 (i.e., the width of the resist mask 33) must be set to be larger than the final manufacturing target values after oxidation by amounts of reduction in width upon oxidation.

Assume that the final manufacturing target values of the widths of the core 26 and of the distal end portion of the tapered portion 27 are 0.3 µm and 0.06 µm, respectively, and a reduction in the thickness of the silicon layer upon oxidation is 0.05 µm. In this case, the resist mask 33 is formed to make the core 26 of the first optical waveguide 20 and the distal end portion of the tapered portion 27 have widths of 0.4 µm and 0.16 µm, respectively, before oxidation. As shown in FIG. 5, the distal end portion of the tapered portion 27 is formed to have a trapezoidal shape.

Since the thicknesses of the first core 26 and tapered portion 27 are reduced by oxidation as in the width direction, the thickness of the silicon layer 31 must be increased in advance by an amount corresponding to a reduction in thickness upon oxidation. If, for example, the final manufacturing target value of the thickness of the first core 26a and tapered portion 27 is 0.3 µm, the thickness of the silicon layer 31 may be set to 0.35 µm.

Figure 4C:
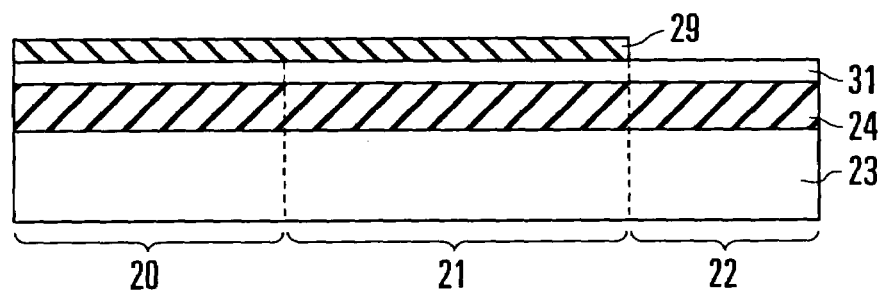
Figure 4D:
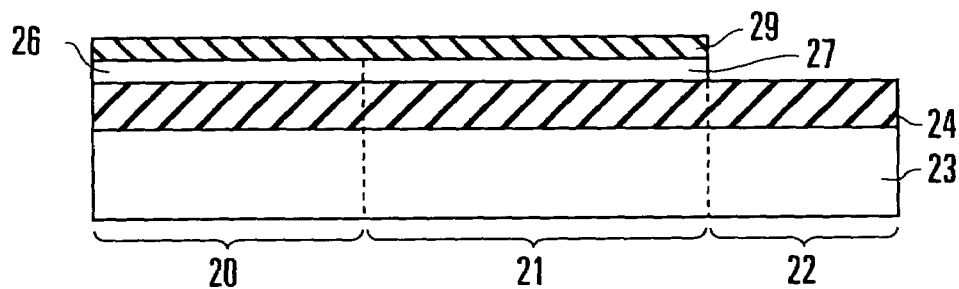
Figure 4E:
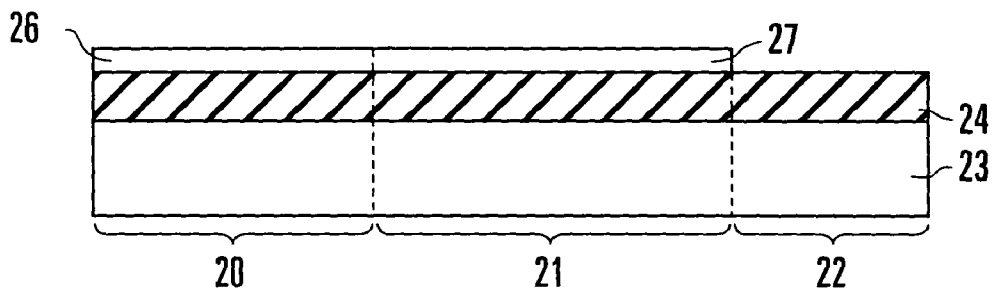

The silicon oxide film 32 is then etched by using the resist mask 33 to form a mask 29 for etching the first core 26 and tapered portion 27. Thereafter, the resist mask 33 is removed by ashing (FIG. 4C). The silicon layer 31 is etched by using the mask 29 to form the first core 26 of the wire-like first optical waveguide 20 and the tapered portion 27 (FIG. 4D). The mask 29 is then removed by wet etching (FIG. 4E).

Figure 4F:
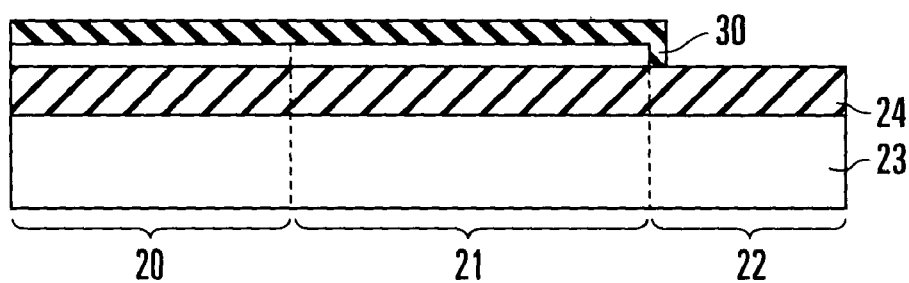

The overall SOI substrate on which the first core 26 of the first optical waveguide 20 and tapered portion 27 are formed is heated at 900° C. in an oxygen atmosphere to oxide the first core 26 and tapered portion 27, thereby forming the silicon oxide film 30 (FIG. 4F). At this time, the silicon is oxidized and changed into the silicon oxide film 30, and hence the widths and thicknesses of the first core 26 and tapered portion 27 decrease with the oxidation time. As shown in FIG. 5, if the tapered portion 27 is formed in advance to be tapered from the first core 26 to its distal end, the shape after oxidation becomes also tapered.

Figure 4G:
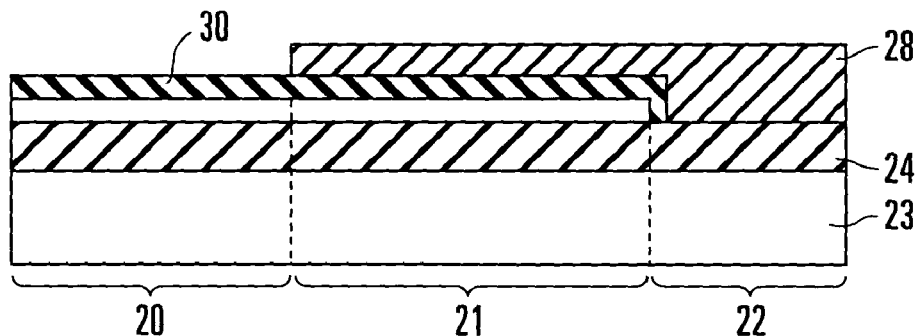

A polymer-based material having a higher refractive index than the under cladding 24 by about 1% is deposited to about 7.0 µm on the SOI substrate, on which the first core 26, tapered portion 27, and silicon oxide film 30 are formed, by, for example, chemical vapor deposition or spin coating. This polymer-based material is then processed by photolithography and etching to form the mode field size conversion portion 21 and the core 28 of the second optical waveguide 22 (FIG. 4G).

Figure 4H:
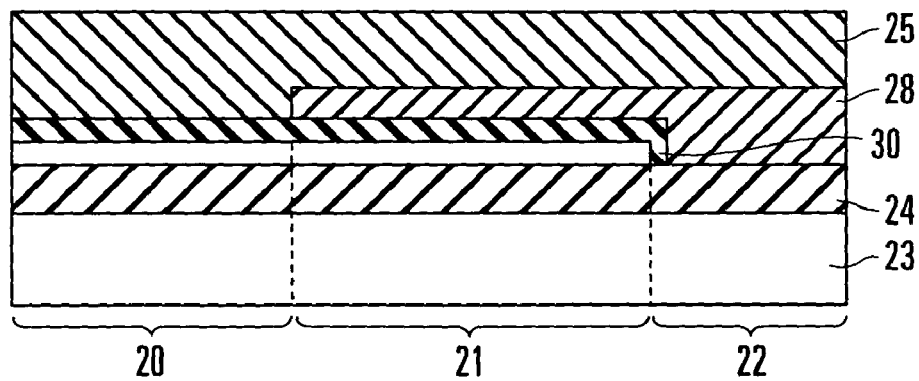

Finally, a polymer-based material having the same refractive index as that of the under cladding 24 is deposited to 15.0 µm or more on the SOI substrate on which the first core 26, tapered portion 27, silicon oxide film 30, and second core 28 are formed, thereby forming the over cladding 25 (FIG. 4H). In this manner, the optical module shown in FIGS. 3A to 3B is completed. In this embodiment, a polymer having a higher refractive index than the under cladding and over cladding by about 1% is used for the core of the second optical waveguide. If a polymer exhibiting a smaller index difference is used, the core size of the second optical waveguide can be further increased.

In this embodiment, since the over cladding made of a polymer having a refractive index similar to that of the under cladding is formed on the first core of the first optical waveguide and the second core of the second optical waveguide, the cores are protected from damage. In addition, since confinement of light in the second optical waveguide can be adjusted by the refractive index of the over cladding, the second core of the second optical waveguide can be further increased in size. This makes it possible to use the optical waveguides of this optical module stably for a long period of time and further decrease the connection loss with respect to the optical fiber.

According to the first embodiment described above, the tapered portion 27 made of silicon is thinned by oxidation. Even if, therefore, the initial width of the distal end portion of the tapered portion 27 is 0.1 µm or more, the width of the distal end portion can be finally reduced to 0.06 µm or less in accordance with the settings of the oxidation amount and the initial width of the distal end portion. According to the method of this embodiment, therefore, a pattern with a resolution of 0.1 µm or less can be formed beyond the solution limit of lithography. In addition, the silicon oxide film 30 is fixed to both sides of the tapered portion 27 made of silicon. This makes it possible to prevent the tapered portion 27 from collapsing regardless of the extent to which the silicon width of the distal end portion of the core 27 decreases.

In the first embodiment, the width of the distal end portion of the tapered portion 27 is set to about 0.06 µm. As shown in FIG. 5, however, the tapered portion 27 made of silicon with a distal end portion having a width of 0 µm with which the conversion efficiency theoretically becomes highest can be realized by setting $D \geq L/2$ where L is the width of the distal end portion of the tapered portion before oxidation and D is a reduction in the thickness of the silicon layer upon oxidation, i.e., making the reduction D in the thickness of the silicon layer upon oxidation equal to or larger than ½ the width L of the distal end portion of the tapered portion before oxidation.

In this embodiment, although the thermal oxidation process is used to form the silicon oxide film, another oxidation method can also be used.

(Second Embodiment)

Figure 7A:
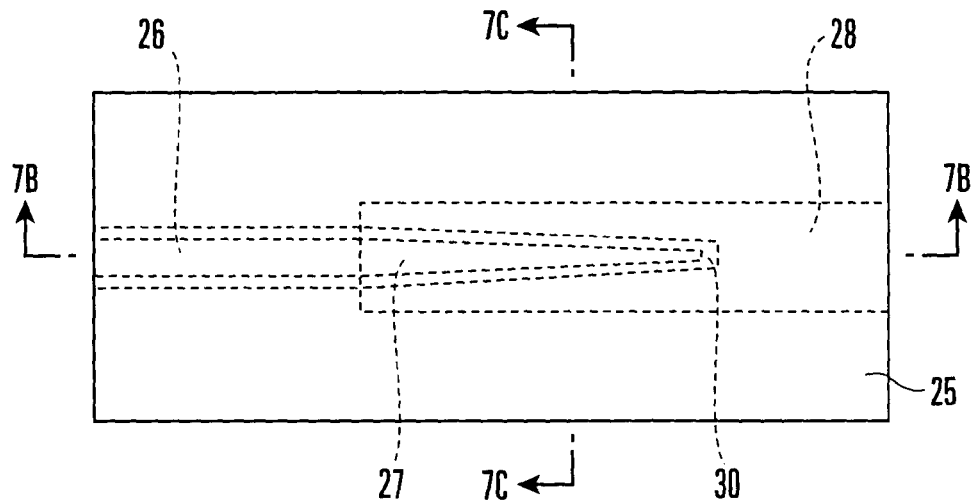
Figure 7B:
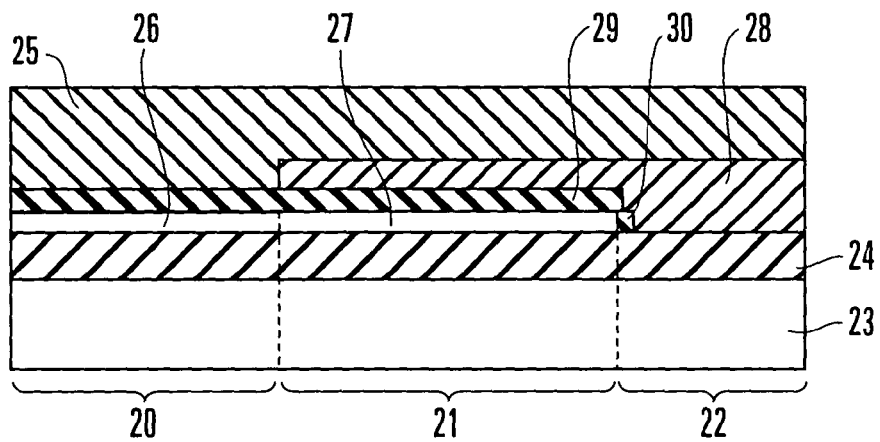
Figure 7C:
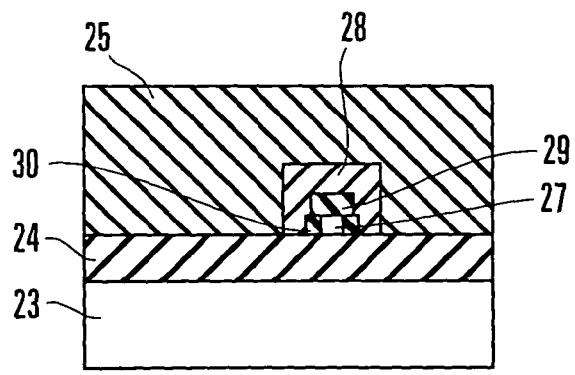

FIGS. 7A to 7C show an optical module according to the second embodiment of the present invention. The same reference numerals as in FIGS. 3A to 3C denote the same part in FIGS. 7A to 7C. A characteristic feature of this embodiment is that a silicon oxide film 30 is formed to be adjacent to only the side surfaces of a tapered portion 27. This allows the tapered portion 27 to be shaped with high precision.

A manufacturing method for the optical module shown in FIGS. 7A to 7C will be described below with reference to FIGS. 8A to 8G.

Figure 8A:
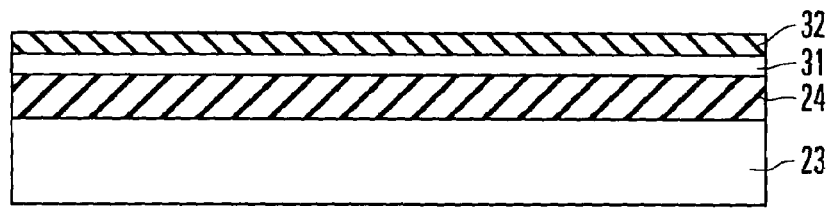
FIGS. 8A to 8G are views showing the steps in a manufacturing method for the optical module according to the second embodiment shown in FIGS. 7A to 7C.
Figure 8B:
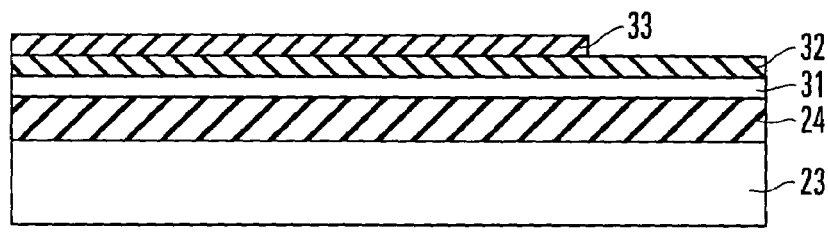
Figure 8C:
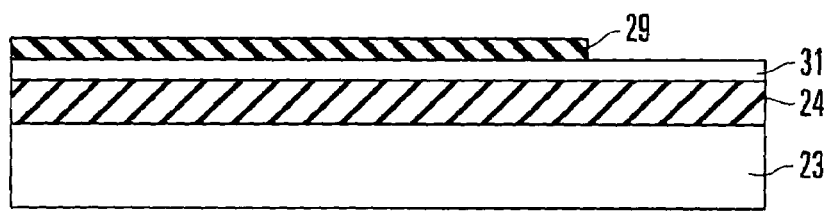
Figure 8D:
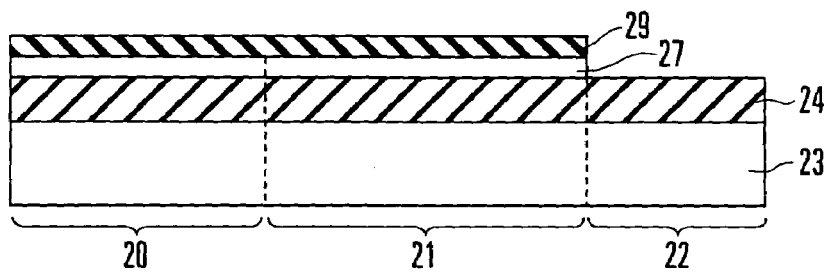
Figure 8E:
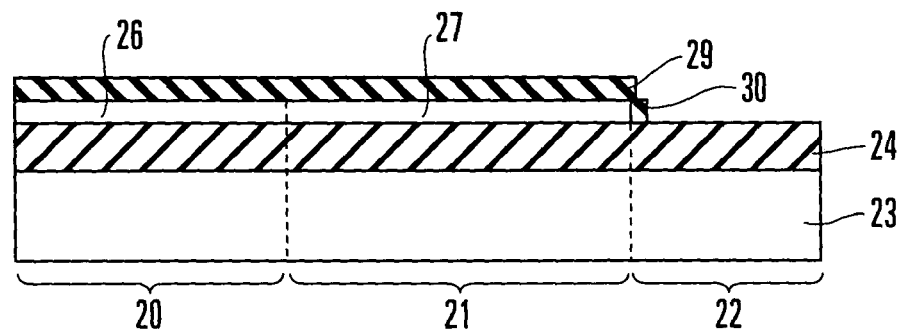

The steps in FIGS. 8A to 8D are the same as those in FIGS. 4A to 4D in the first embodiment. In the first embodiment, the first core 26 of the first optical waveguide 20 and the tapered portion 27 continuous with the core 26 are formed by etching the silicon layer 31 by using the mask 29, and an oxidation process is performed after the mask 29 is removed. In this embodiment, an oxidation process similar to that in the first embodiment is performed without removing the mask 29. With this process, the first core 26 and tapered portion 27 have quadrangular cross sections, and only their side surfaces are oxidized while their upper surfaces are not oxidized. As a consequence, the silicon oxide film 30 is formed on only the side surfaces of the first core 26 and tapered portion 27 (FIG. 8E).

Figure 8F:
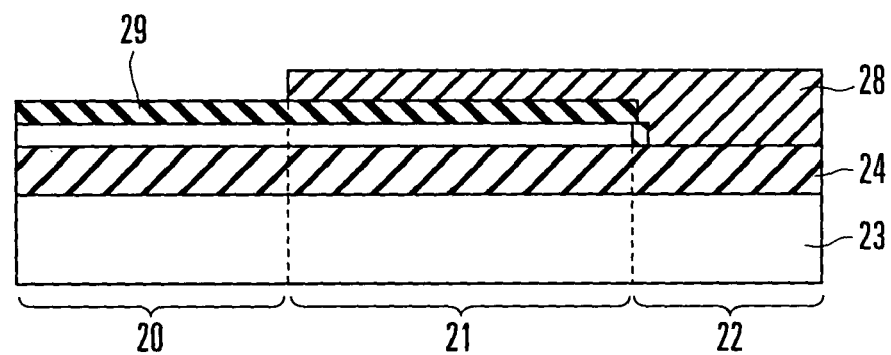
Figure 8G:
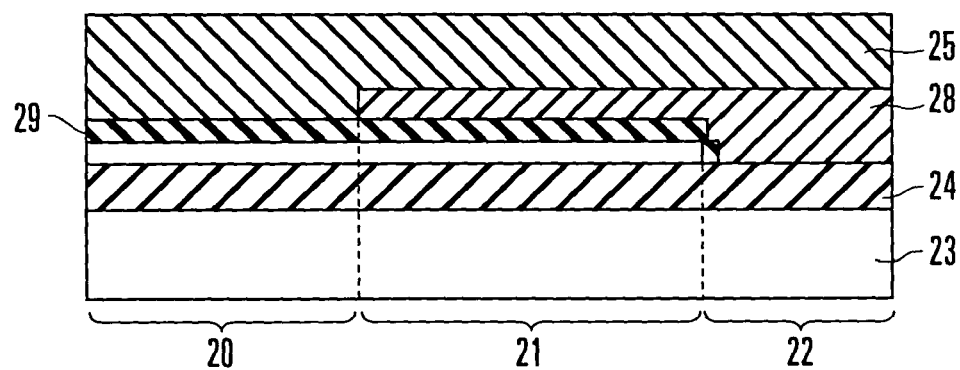

The steps in FIGS. 8F and 8G are the same as those in FIGS. 4G and 4H in the first embodiment.

As described above, in this embodiment, shaping process control can be facilitated by oxidizing only the side surfaces of the first core 26 of the first optical waveguide and the tapered portion 27 without removing the mask 29.

In the first and second embodiments, the tapered portion 27 and the second core 28 placed thereon are in contact with each other through the silicon oxide film 30. However, since the silicon oxide film 30 is sufficiently thin relative to the wavelength (e.g., 1.55 µm) of light used for communication, the silicon oxide film 30 has no influence on the optical connection between the first core 26 and the second core 28.

As described above, according to the first and second embodiments of the present invention shown in FIGS. 2A to 8G, since the first core of the first optical waveguide and the tapered portion integrally coupled to an end portion of the first core are oxidized, the silicon core with the distal end of the tapered portion having a width dimension of about 0.06 µm or less can be accurately and economically processed by using a lithographic process without a resolution of 0.1 µm or less.

In addition, according to these embodiments, since the first optical waveguide, spot size conversion portion, and second optical waveguide are covered with the over cladding layer having a refractive index similar to that of the under cladding, the core size of the connection waveguide can be increased. This can reduce the connection loss with respect to an optical fiber. Since the silicon wire waveguide core can be protected against damage, the optical waveguide can be stably used for a long period of time.

By setting a reduction in the thickness of the silicon layer upon oxidation to be ½ or more the width dimension of the distal end of the tapered portion before oxidation, the tapered portion with its distal end having a width dimension of 0 µm can be realized, with which the conversion efficiency theoretically becomes highest.

Since only the side surfaces of the first core and tapered portion are oxidized, oxidation can be done in consideration of only a reduction in the thickness of the silicon upon oxidation and the width dimension of the tapered portion before oxidation. This makes it possible to facilitate shaping control.

(Third Embodiment)

This embodiment is a modification of the manufacturing method for the optical module shown in FIGS. 4A to 4H, and exemplifies only the part of the method, in particular, in which after a silicon layer serving as the first core is formed on an under cladding, a silicon oxide film is formed to cover the first core. The use of this embodiment makes it possible to manufacture an optical module in a shorter period of manufacturing time than the conventional method.

Figure 9A:
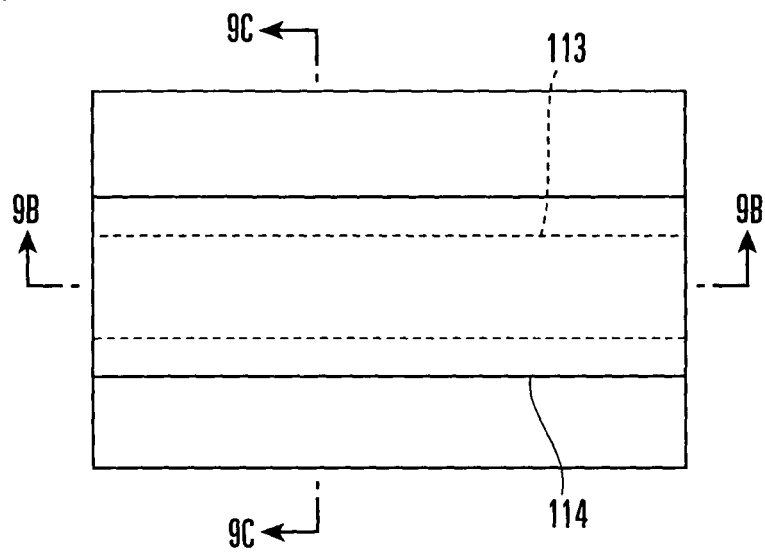
Figure 9B:
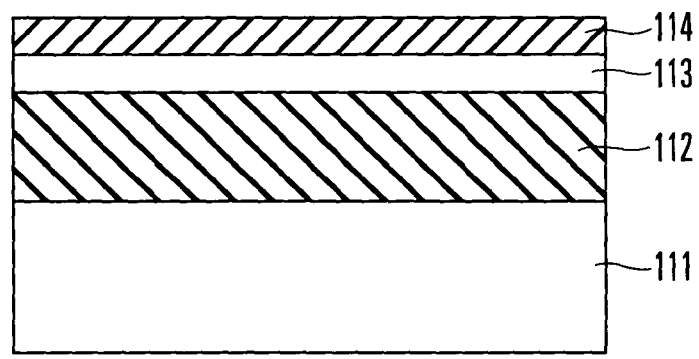
Figure 9C:
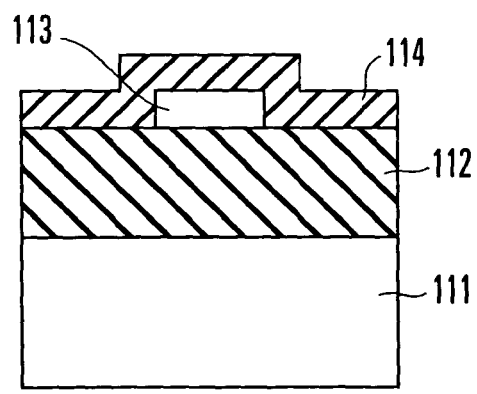

Referring to FIGS. 9A to 9C, reference numeral 111 denotes a silicon substrate; 112, an under cladding layer formed from a silicon oxide film ($SiO_2$); and 113, a core serving both as the first core of the first optical waveguide and the tapered portion in the first embodiment described above. The core 113 is made of silicon and patterned into a thin wire. Reference numeral 114 denotes a silicon oxide film placed to cover the core 113. In this case, the width and thickness of the core 113 are different from each other and fall within 0.2 µm to 0.5 µm, or are equal to each other and fall within 0.2 µm to 0.5 µm.

A manufacturing method for the optical module having the structure shown in FIGS. 9A to 9C will be described next with reference to 10A to 10F.

Figure 10A:
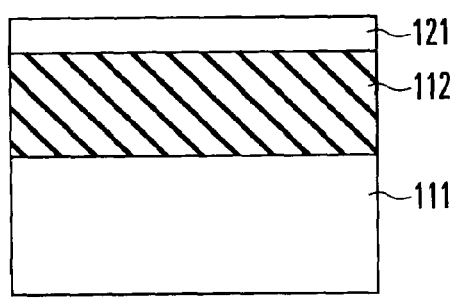
FIGS. 10A to 10F are views showing the steps in a manufacturing method for the optical module according to the third embodiment shown in FIGS. 9A to 9C.

Referring to FIGS. 10A to 10F, first of all, there is prepared an SOI substrate constituted by the silicon substrate 111, the under cladding layer 112 which is flat-shaped as a whole, made of silicon oxide, and formed on the silicon substrate 111, and a silicon layer 121 formed on the under cladding layer 112 (FIG. 10A). The silicon layer 121 is the core of the first optical waveguide and processed into the terminal end portion of the mode field size conversion portion as is obvious from the above embodiments.

Figure 10B:
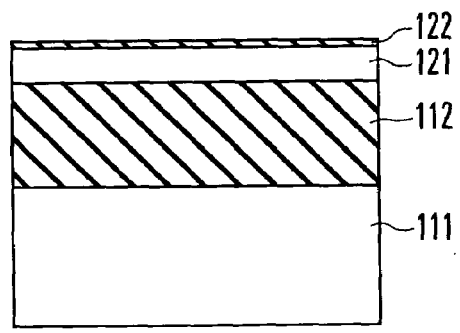
Figure 10C:
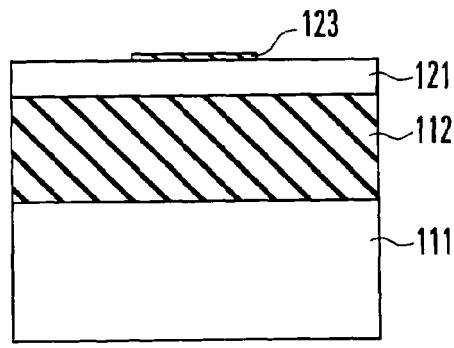

As shown in FIG. 10B, the surface of the silicon layer 121 of the SOI substrate is coated with a resist 122, and a desired pattern shape is printed into the resist 122 by using lithography such as electron beam lithography or photolithography. The pattern shape is then developed to obtain a resist pattern 123 having a desired shape (FIG. 10C).

Figure 10D:
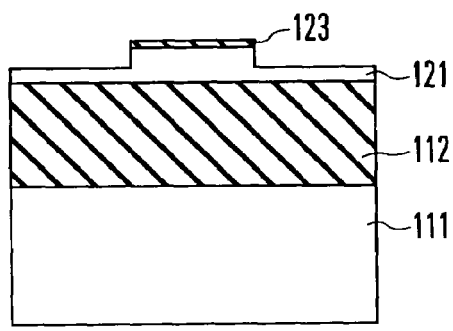

The silicon layer 121 is then etched by using the resist pattern 123 as a mask. This etching process is stopped halfway without completely etching the silicon layer 121, as shown in FIG. 10D. On the two sides of the silicon layer on which the resist pattern 123 is placed and left without being etched, a silicon layer thinner than the silicon layer is left.

Note that if a sufficient selectivity between the resist pattern 123 and the silicon layer cannot be obtained, an etching mask for etching the silicon layer 121 may be used. In this case, an etching mask layer is deposited on the silicon layer 121, and the upper surface of the etching mask layer is coated with the resist 122. The resist 122 is processed to form the resist pattern 123. The etching mask layer is then etched by using the resist pattern 123 as a mask to form an etching mask. The silicon layer 121 may be etched by using this etching mask.

Figure 10E:
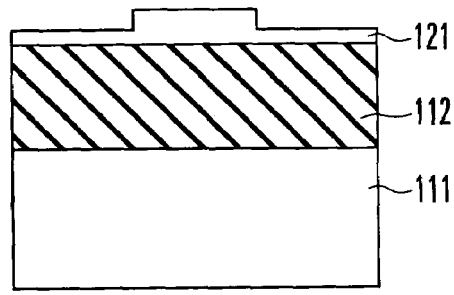
Figure 10F:
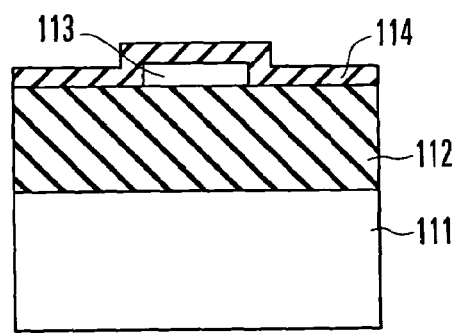

As shown in FIG. 10D, after the silicon layer 121 is etched, the resist pattern 123 (or the etching mask) is removed (FIG. 1E). The overall SOI substrate shown in FIG. 10E is heated in a high-temperature thermal oxidation furnace to oxidize the silicon layer 121. As a result, the upper surface and side wall portions of the silicon layer 121 are oxidized to form the over cladding layer 114 formed from the silicon oxide film, and the silicon layer 121 left inside the over cladding layer 114 becomes the core 113 of the silicon wire optical waveguide (FIG. 10F). In this manner, an optical module like the one shown in FIGS. 9A to 9C is completed.

As is obvious from the above description, the width and thickness of the silicon layer are reduced by the thermal oxidation process. In consideration of reductions in width and thickness upon oxidation, therefore, the width of the resist pattern 123 (etching mask) must be set to be larger than the width of the wire-like core 113 to be formed, and thickness of the silicon layer 121 before etching must also be set to be larger than the thickness of the core 113 to be formed.

Figure 11:
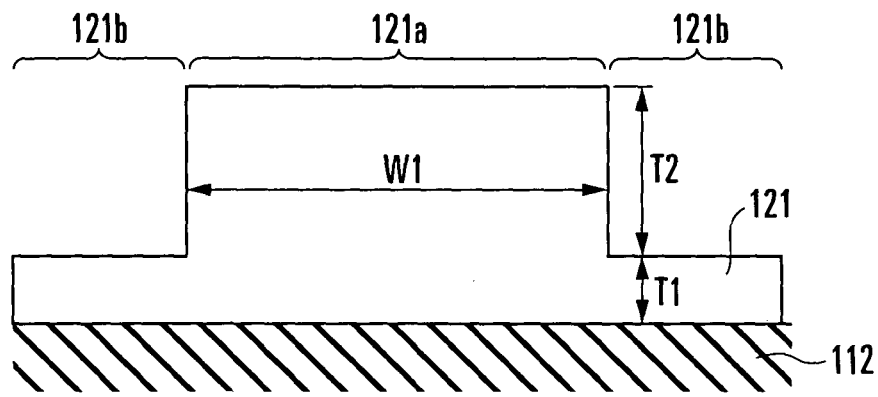
FIG. 11 is a view for explaining in detail part of the manufacturing method for the optical module shown in FIGS. 10A to 10F, and more specifically, an enlarged sectional view of an optical module before a thermal oxidation process which is the step of forming an over cladding layer.
Figure 12:
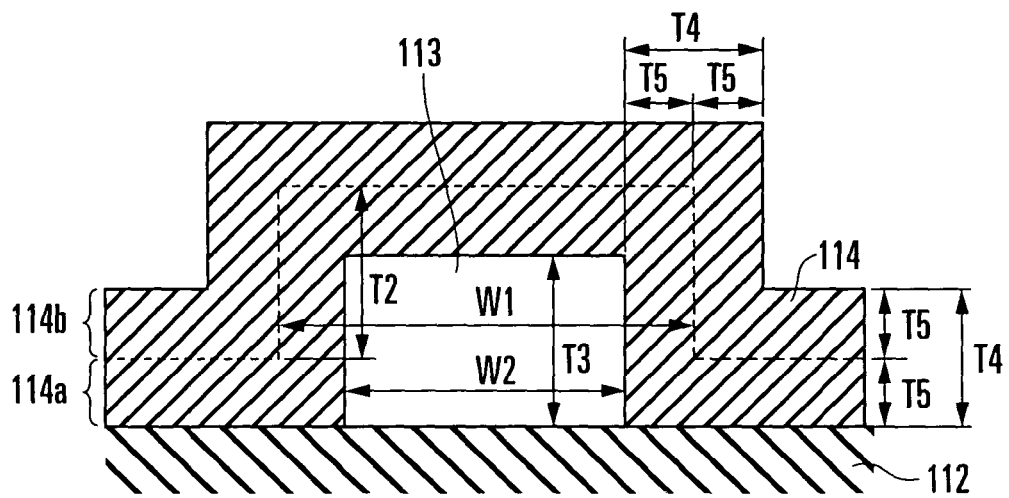
FIG. 12 is an enlarged sectional view of an optical module after a thermal oxidation process as a post-step in FIG. 11.

FIG. 11 is an enlarged view of the main part in FIG. 10E. FIG. 12 is an enlarged view of the main part in FIG. 10F in the case of T1<T3/2. Referring to FIG. 11, reference numeral 121a denotes the first region, of the silicon layer 121, which becomes the first core 113 of the first optical waveguide and the silicon oxide film 114 placed to cover the core 113 after oxidation; and 121b, the second region which becomes the silicon oxide film 114 placed on the under cladding layer 112 except for the first core 113 after oxidation. Reference symbol W1 denotes the width of the first region 121a; T1, the thickness of the second region 121b; and T2, the value obtained by subtracting the thickness T2 of the second region 121b from the thickness of the first region 121a (the initial thickness of the silicon layer 121), i.e., the etching depth.

Referring to FIG. 12, reference numeral 114a denotes a portion of the silicon oxide film 114 which was the silicon layer 121 before oxidation; and 114b, a portion formed by expansion accompanying oxidation. Reference symbol W2 denotes the width of the first core 113 of the first optical waveguide; T3, the thickness of the first core 113; T4, the thickness of the silicon oxide film 114; and T5, the thickness of the silicon oxide films 114a and 114b.

When all the silicon of the second region 121b is converted into a silicon oxide film by thermal oxidation, the over cladding layer 114 whose thickness T4 is twice the thickness T5 (=T1) of the oxidized silicon film is formed. That is, since oxidation from below the pattern is negligibly small, a change in the thickness of the silicon film is equal to the oxidation amount of the silicon film by oxidation from above the pattern. This oxidation amount corresponds to ½ the thickness of the over cladding layer 114.

The silicon films each having the thickness T5 on the two sides of the first region 121a are converted into silicon oxide films, and the pattern edge moves to the inside. Therefore, the first region 121a is narrowed by an amount corresponding to the thickness T4 of the silicon oxide film 114. For this reason, the width W1 of the first region 121a (the width of the resist pattern 123) before oxidation must be set to W2+2×T5=W2+T4.

With regard to the thickness direction of the silicon layer 121, the silicon film having the thickness T5 is converted into a silicon oxide film, and hence the thickness (the initial thickness of the silicon layer 121) T2+T1 of the first region 121a before oxidation must be set to T3+T5 in advance. As is obvious from FIG. 12 as well, T2=T3.

The thickness T1 (=T5) of the silicon film left in the second region 121b may be so set as to obtain the silicon oxide film 114 having a desired thickness. However, the thickness T1 is preferably set to ½ or more the thickness T3 of the first core 113 of the first optical waveguide to be finally manufactured. Making such dimensional settings makes it possible to obtain the silicon oxide film 114 having a sufficient thickness. Even if, therefore, the silicon oxide film 114 is polished to bond an electronic device on the optical module of this embodiment, the core 113 is never exposed.

Figure 13:
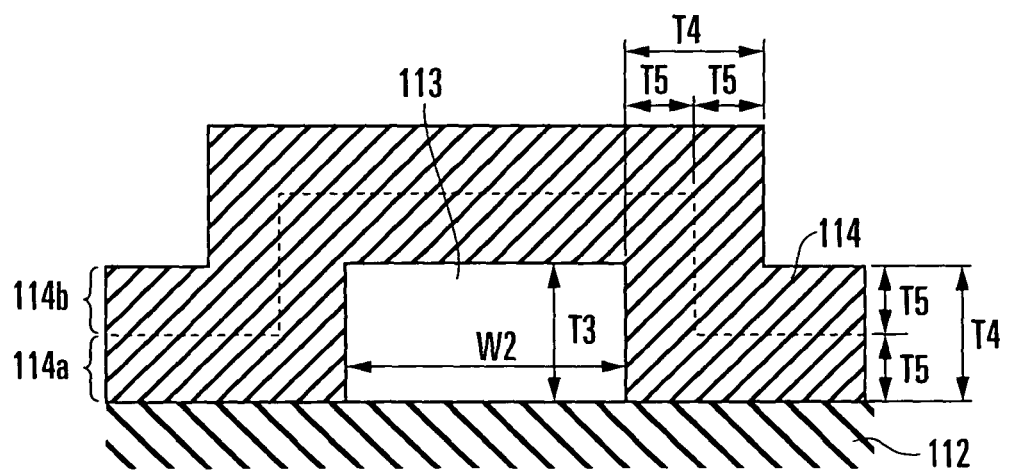
FIG. 13 is an enlarged sectional view of another optical module after a thermal oxidation process as a post-step in FIG. 11.

FIG. 13 shows the core of the optical module, the silicon oxide film, and the cladding in the case of T3=2×T1. When, for example, the core 113 of the first optical waveguide, whose width and thickness are both, for example, 300 nm, is to be finally manufactured, the silicon layer 121 having a thickness of 450 nm is left in the first region 121a having a width of 600 nm and is etched to a depth of 300 nm. At this time, only a silicon layer having a thickness of 150 nm is left in the second region 121b. An oxide film is formed.

When the silicon oxide film 114 is oxidized to have a thickness of 300 nm, the entire silicon layer in the second region 121b is converted into a silicon oxide film. In the first region 121a, the thickness of the silicon layer decreases by 150 nm, i.e., from 450 nm to 300 nm, and the width of the silicon layer decreases by 150 nm on each side, i.e., from 600 nm to 300 nm. As a consequence, the silicon wire optical waveguide core 113 whose width and thickness both are 300 nm is formed. If a silicon layer having a thickness of ½ or more that of the first core 113 is left in the second region 121b, the over cladding layer 114 having a thickness equal to or more than that of the core 113 can be formed.

As described above, in this embodiment shown in FIGS. 9A to 13, etching of the silicon layer 121 is stopped halfway to leave a silicon layer with the predetermined thickness T1 (=T5) around the first region 121a, which serves as the first core 113. Thermal oxidation is then performed to entirely convert this silicon layer with the thickness T1 into a silicon oxide film, thereby forming the first core 113 having a desired dimension. At the same time, the core 113 can be covered with a silicon oxide film which is thick enough to function as the silicon oxide film 114 which becomes an over cladding or its portion. The silicon oxide film has a refractive index lower than that of silicon, and light can be confined in the silicon portion by using the refractive index difference between silicon and the silicon oxide film. That is, the silicon oxide film can be functioned as a silicon waveguide or optical functional element. As a consequence, there is no need to form the silicon oxide film 114 in a different step, or part of the silicon oxide film 114 can be formed at the same time as an oxidation process in a thermal oxidation step. In addition, the roughness of the side wall portions of the core 113 can be reduced by oxidation.

In this embodiment shown in FIGS. 9A to 13, since the silicon pattern (first region 121a) before oxidation can be formed wider than that formed in the conventional case without oxidation, the aspect ratio of the silicon pattern before oxidation (aspect ratio=b/a where a is the width of the silicon pattern and b is its thickness) decreases. This can increase the degree of margin for pattern formation.

When, for example, the core 113 having a width of 60 nm and a thickness of 300 nm is to be finally formed, the aspect ratio without any oxidation step is 300/60=5. In contrast, in this embodiment, if the thickness of the silicon oxide film 114 is T4=300 nm, the width of the first region 121a before oxidation is W2+T4=60+300=360 nm, and its etching depth is T2=T3=300 nm. The aspect ratio is therefore 300/360=0.83. As a consequence, in manufacturing an optical module, a pattern can be formed by using an inexpensive lithography system with an increased degree of manufacturing margin.

According to the third embodiment of the present invention shown in FIGS. 9A to 13, in forming a core by etching a silicon layer, the silicon layer is oxidized such that a silicon layer around the core which is to be removed by etching is left by a predetermined thickness, and the silicon layer to be removed by etching is converted into a silicon oxide film. This makes it possible to simultaneously form a core made of silicon and a silicon oxide film placed therearound. As a consequence, there is no need to separately form a silicon oxide film after the formation of a core, thus shorting the manufacturing process as compared with the prior art. In addition, oxidation can reduce the roughness of the side wall portions of the core. In addition, as compared with the prior art, the aspect ratio of a silicon pattern before oxidation decreases, the degree of margin for pattern formation can be increased. In manufacturing an optical module, therefore, a pattern can be formed by using an inexpensive lithography apparatus with an increased degree of manufacturing margin.

Furthermore, since the silicon layer to be removed by etching is left by a thickness of ½ or more, a silicon oxide film having a sufficient thickness can be formed. Even if, therefore, the silicon oxide film is polished to bond an electronic device on the optical module, there is no chance of exposing the core.

The silicon oxide film formed in the third embodiment described above can also be used as an over cladding covering the first core of the first waveguide.

(Fourth Embodiment)

Figure 14A:
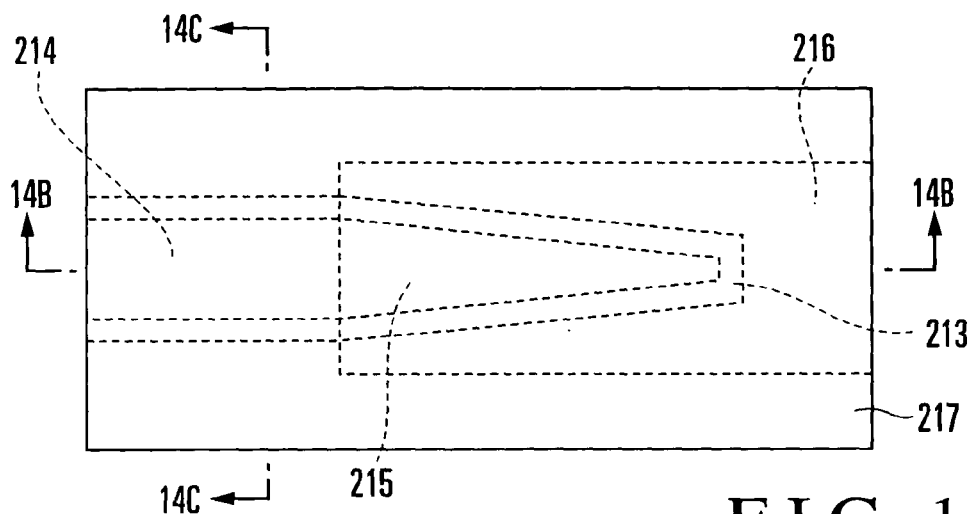
Figure 14B:
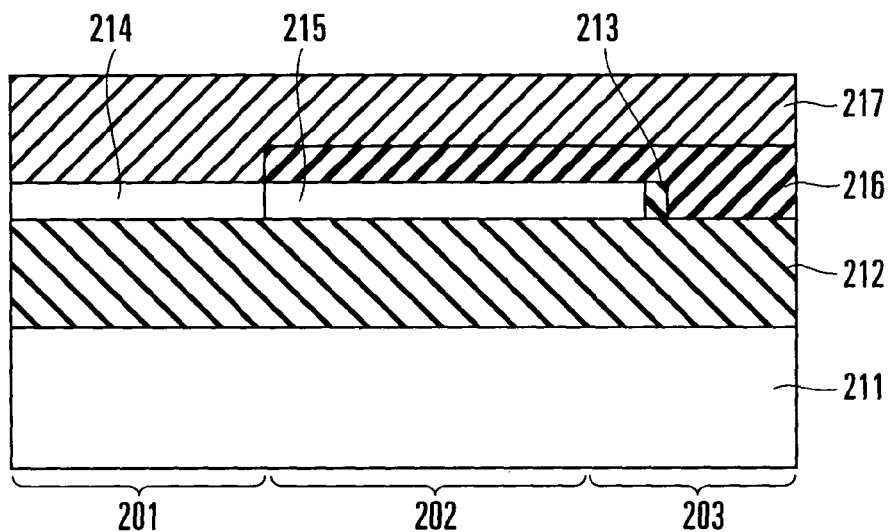
Figure 14C:
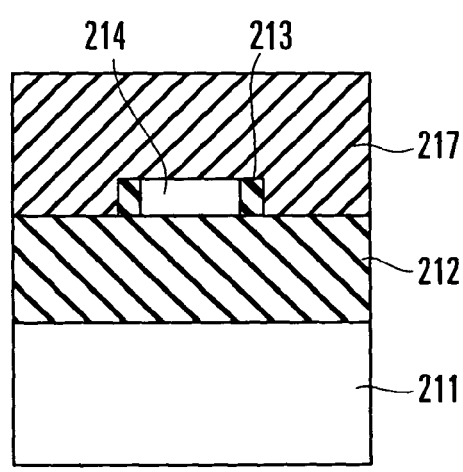

FIGS. 14A to 14C show still another embodiment of the present invention, in which when a tapered portion is used as a terminal end portion, in particular, silicon oxide films are placed on only side surfaces or side walls of the tapered portion. Referring to FIGS. 14A to 14C, reference numeral 201 denotes a first optical waveguide formed from a silicon wire; 202, a mode field size conversion portion; 203, a second optical waveguide connected to the optical waveguide 201; 211, a silicon substrate; 212, an under cladding layer made of a silicon oxide film and formed on the silicon substrate; 213, a silicon oxide film formed by oxidation; and 214, a first core having a quadrangular cross section which is selectively formed on the under cladding. The core 214 is made of silicon, has a wire-like shape, and is an element of the first optical waveguide 201. Reference numeral 215 denotes a tapered portion (a terminal end portion of the optical waveguide 201) which is made of silicon and formed on an end portion of the first core 214 such that the width gradually decreases toward the distal end (connection waveguide side) while the height of a cross section (thickness) of the core 214 is kept unchanged; 216, a second core of the second optical waveguide 203 connected to the mode field size conversion portion 202 and first optical waveguide 201; 217, an over cladding layer which is formed from a silicon oxide film and placed to cover the under cladding layer 212, first core 214, tapered portion 215, and second core 216 which are described above. In the optical waveguide 201, the width and thickness of the first core 214 are different from each other and fall within 0.2 μm to 0.5 μm, or are equal to each other and fall within 0.2 μm to 0.5 μm.

The tapered portion 215 formed on the under cladding layer 212 is covered with the silicon oxide films 213 formed on its side surfaces and the core 216. The section where the tapered portion 215 is covered with the core 216 serves as the mode field size conversion portion 202, in which the tapered portion 215 and second core 216 are optically coupled to each other. The tapered portion 215 and core 216 are preferably positioned such that their axes coincide with each other. However, they need not be precisely aligned with each other as long as the tapered portion 215 is accommodated within the width of the second core 216.

The propagation state of light in the optical module shown in FIGS. 14A to 14C will be described next.

Light incident from the left end face of the first core 214 of the first optical waveguide 201 shown in FIGS. 14A and 14B propagates through the core 214, and then reaches the left end position of the tapered portion 215 of the mode field size conversion portion 202. As the light propagates through the tapered portion 215 to the right in FIG. 14A, the core width the core width gradually decreases, and the confinement of the light weakens. As a result, the mode field size tries to increase circumferentially. At this time, however, since the second core 216 higher in refractive index than the under cladding layer 212 exists adjacent to the tapered portion 215, the optical power distribution gradually shifts from the first core 214 of the first optical waveguide 201 to the second core 216 of the second optical waveguide 203.

In contrast to the above case, when light is incident from the right end portion of the second core 216 of the second optical waveguide 203 shown in FIGS. 14A and 14B, the light distribution moves to the first core 214 of the first optical waveguide 201 through the second core 216 and tapered portion 215 as the light travels from the right to the left. As described above, a mode field size (diameter) can be converted with high efficiency by connecting the first core 214 of the first optical waveguide 201 to the second core 216 of the second optical waveguide 203 through the tapered portion 215 in this manner.

Figure 15A:
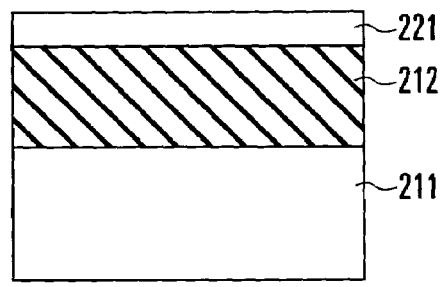

A manufacturing method for the optical module shown in FIGS. 14A to 14C will be described next with reference to FIGS. 15A to 15H. Referring to FIGS. 15A to 15H, an SOI substrate is prepared, which is constituted by the silicon substrate 211, the flat under cladding layer 212 formed on the silicon substrate 211, and a silicon layer 221 formed on the under cladding layer 212 (FIG. 15A).

Figure 15D:
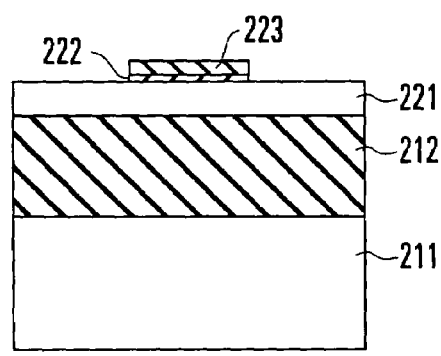
Figure 15B:
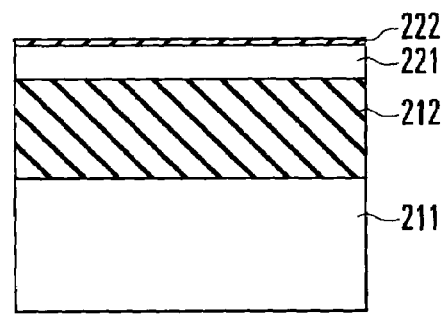

A silicon nitride film 222 is deposited on the surface of the silicon layer 221 of the SOI substrate by using an ECR-CVD (Electro Cyclotron Resonance—Chemical Vapor Deposition) method or an LPCVD (Low Pressure Chemical Vapor Deposition) method (FIG. 15B). The upper surface of the silicon nitride film 222 is coated with a resist, and a desired pattern shape is printed into the resist by using known lithography such as electron beam lithography or photolithography. Thereafter, a resist pattern 223 having a desired shape can be obtained by developing the pattern (FIG. 15C)

The silicon nitride film 222 is etched by using the resist pattern 223 as a mask (FIG. 15D). If, for example, the silicon nitride film 222 is etched by using a g-line photoresist as an etching mask and $CF_4/O_2$ as an etching gas, a sufficient selectivity can be obtained. No problem arises even if another kind of gas is used.

Note that if a sufficient selectivity between the resist pattern 223 and the silicon nitride layer 222 cannot be obtained, an etching mask for etching the silicon nitride film 222 may be used. In this case, an etching mask layer is deposited on the silicon nitride film 222, and the upper surface of the etching mask layer is coated with a resist. This resist is processed to form the resist pattern 223. The etching mask layer is then etched by using the resist pattern 223 as a mask to form an etching mask. The silicon nitride film 222 is etched by using this etching mask.

Figure 15E:
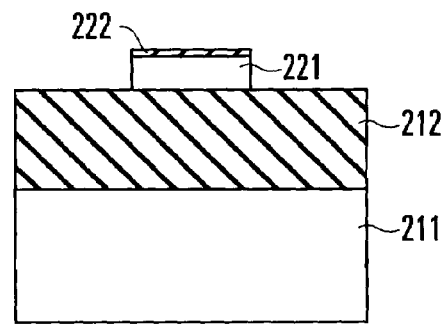
Figure 15C:
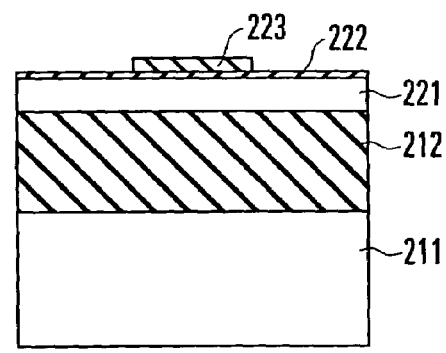

Subsequently, the silicon layer 221 is etched by using the silicon nitride film 222 as an etching mask to form the first core 214 of the first optical waveguide 201 and the tapered portion 215 of the mode field size conversion portion 202 (FIG. 15E). The resist pattern 223 may be removed before etching of the silicon layer 221. Alternatively, the silicon layer 221 may be etched without removing the resist pattern 223. If the silicon layer 221 is etched without removing the resist pattern 223, the resist pattern 223 must be removed after etching of the silicon layer 221. FIG. 16 shows the first core 214 of the first optical waveguide 201 and the tapered portion 215 of the mode field size conversion portion 202 after the completion of the etching step in FIG. 15E. Note that an illustration of the silicon nitride film 222 is omitted in FIG. 16.

The overall SOI substrate on which the first core 214 of the first optical waveguide 201 and the tapered portion 215 of the mode field size conversion portion 202 are formed is heated in a high-temperature thermal oxidation furnace to oxidize the first core 214 and tapered portion 215. At this time, the silicon nitride film 222 exists on the upper surfaces of the first core 214 and tapered portion 215, and no silicon nitride film 222 exists on their side surfaces. Therefore, only the side wall portions of the core 214 and tapered portion 215 are selectively oxidized to form the silicon oxide films 213 on the side wall portions (FIG. 15F).

As is obvious from the above description, the resist pattern 223 is used to form an etching mask by processing the silicon nitride film 222, and the silicon layer 221 is etched by using the processed silicon nitride film 222 to form the first core 214 and the tapered portion 215 which is continuous with the first core 214. Therefore, the plane shape of the core 214 and tapered portion 215 is almost identical to that of the resist pattern 223 (not perfectly identical because of a change in width in the etching step).

Figure 15F:
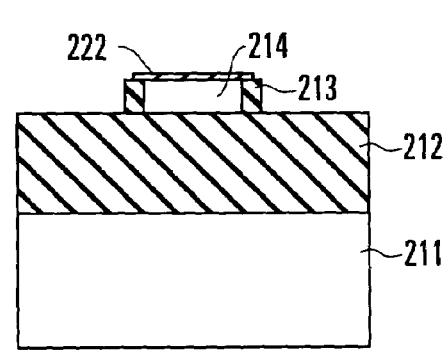

After the first core 214 and tapered portion 215 are formed, the width of the silicon layer decreases in the thermal oxidation step in FIG. 15F. For this reason, the widths of the first core 214 and tapered portion 215 (i.e., the width of the resist pattern 223) must be set in advance to larger widths in consideration of reductions in amount due to oxidation.

Figure 17:
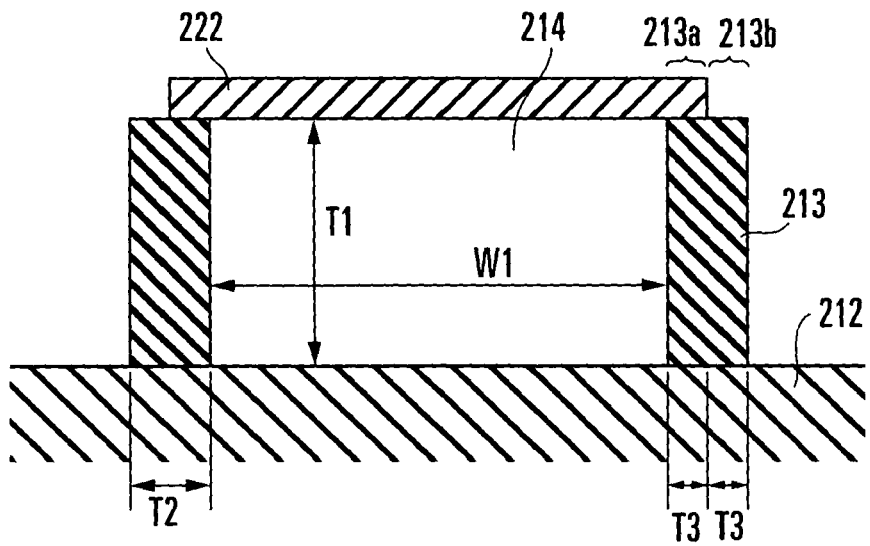
FIG. 17 is an enlarged sectional view showing an optical module to explain the state of thermal oxidation in FIG. 15F.

FIG. 17 shows an enlarged section of FIG. 15F. Referring to FIG. 17, reference numeral 213a denotes a portion of the silicon oxide film 213 which has been a silicon layer before oxidation; and 213b, a portion formed upon expansion accompanying oxidation. Reference symbol W1 denotes the width of the first core 214 of the first optical waveguide 201 after oxidation; T1, the thickness of the first core 214 after oxidation; T2, the thickness of the silicon oxide film 213; and T3, the thickness of the silicon oxide films 213a and 213b.

In a thermal oxidation step, the silicon oxide film 213 having the thickness T2 about twice the thickness T3 of the oxidized silicon layer. In other words, the silicon layers, each having the thickness T3, on the two sides of the pattern are converted into the silicon oxide films 213, and hence the silicon layers are oxidized to an extent corresponding to the thickness T2 of the silicon oxide films 213 as a whole. If, therefore, for example, the silicon oxide film 213 with T2=100 nm is to be formed in a thermal oxidation step and the first core 214 with W1=300 nm is to be formed, the width of the first core 214 before the thermal oxidation step must be set to 400 nm. Obviously, the dimensions of the resist pattern 223 must be set in consideration of width changes in an etching step.

The silicon layer of the tapered portion 215 decreases in width by oxidation as well. Obviously, therefore, if the tapered portion 215 before oxidation is tapered such that it gradually narrows from the first waveguide 214 to its distal end, the tapered portion 215 after oxidation has a tapered shape.

After the completion of the thermal oxidation step, the silicon nitride film 222 is removed by a technique such as etching (FIG. 14G). For example, a polymer-based material lower in refractive index than silicon and higher in refractive index than the under cladding layer 212 is deposited on the SOI substrate, on which the first core 214, tapered portion 215, and silicon oxide film 213 are formed, by chemical vapor deposition, spin coating, or the like. This polymer-based material is then processed by photolithography and etching to form the core 216 having a larger cross section than the core 214.

Subsequently, a silicon oxide film or polymer-based material equal in refractive index to the under cladding layer 212 is deposited on the SOI substrate on which the first core 214 of the first optical waveguide 201, the tapered portion 215, the silicon oxide film 213, and the core 216 are formed, thereby forming the over cladding layer 217 (FIG. 15H). In this manner, the optical module shown in FIGS. 14A to 14C is completed.

Note that if the silicon nitride film 222 is designed as part of the optical device, the silicon nitride film 222 need not be removed.

As described above, in the fourth embodiment shown in FIGS. 14A to 17, after the silicon nitride film 222 deposited before etching of the silicon layer 221 is used as a hard mask at the time of silicon etching, thermal oxidation is performed without removing the silicon nitride film 222. Since silicon nitride is a material resistant to oxidation, i.e., a material exhibiting an anti-oxidation effect, the upper surface of the silicon layer 221 covered with the silicon nitride film 222 is not oxidized, and only the side wall portions of the silicon layer 221 which are not covered with the silicon nitride film 222 are oxidized. As a result, there is no need to increase the thickness of the silicon layer 221 in advance in consideration of the amount of oxidation.

Figure 18:
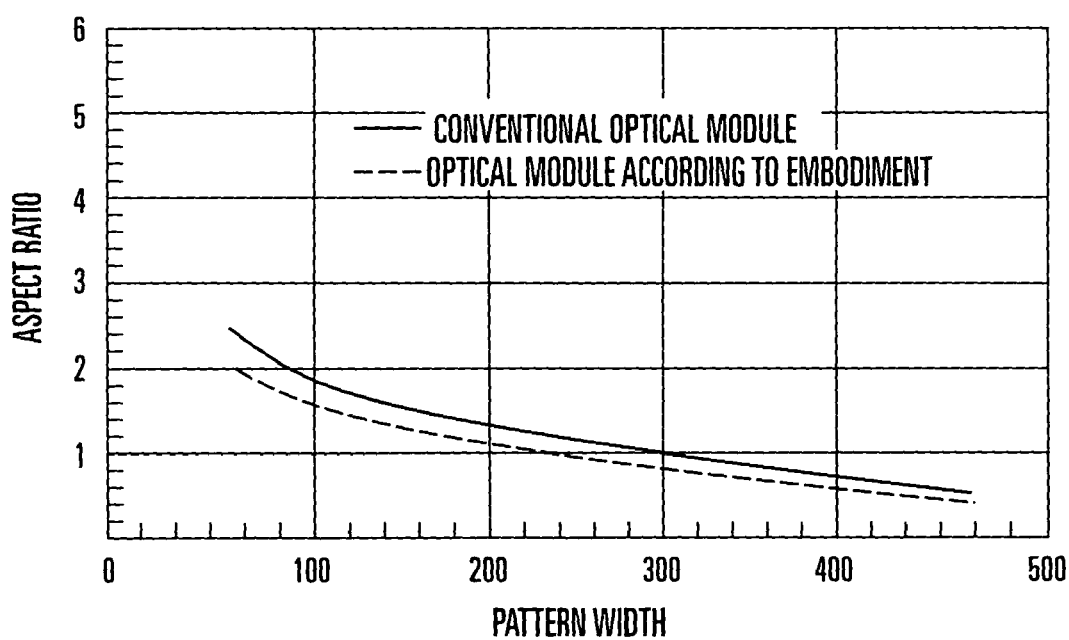
FIG. 18 is a graph showing the relationship between the pattern width and the pattern aspect ratio in each of optical modules according to the fourth embodiment of the present invention and the prior art.

In addition, in the fourth embodiment, since the silicon pattern before oxidation can be formed wider than that formed in the prior art, the aspect ratio of the silicon pattern before oxidation (aspect ratio=b/a where a is the width of the silicon pattern and b is its thickness) decreases. This can increase the degree of margin for pattern formation. FIG. 18 shows the relationship between the pattern width and the required pattern aspect ratio in a conventional optical plane circuit type optical device and the optical module of the present invention. In the case shown in FIG. 18, the thickness of a silicon pattern after oxidation is set to 300 nm, and the thickness of a silicon oxide film formed by oxidation is set to 100 nm.

As is obvious from FIG. 18, this embodiment allows a pattern with a lower aspect ratio than that in the prior art to be formed. As a consequence, the degree of margin for the manufacture of an optical module, and a pattern can be formed by using an inexpensive lithography system.

Note that since the silicon oxide film 213 is sufficiently thin relative to the wavelength of light (e.g., 1.55 μm) used in communication, there is little possibility that the silicon oxide film 213 influences optical connection between the first core 214 of the first optical waveguide 201 and the second core 216 of the second optical waveguide 203. However, the refractive index of the silicon oxide film 213 is preferably higher than that of the under cladding layer 212. This is because if the silicon oxide film 213 has a higher refractive index, it can become the second core or its part. In order to increase the refractive index of the silicon oxide film 213, for example, germanium ions or the like may be implanted into the silicon oxide film 213 before the formation of the second core 216. This makes it possible to increase the refractive index of the silicon oxide film 213 within a smaller range than that of silicon, thus further ensuring optical connection between the first core 214 of the first optical waveguide and the second core 216 of the second optical waveguide.

In the fourth embodiment, silicon nitride is used as an anti-oxidation film. However, a refractory metal such as Ta or W is used not to form any oxide or a metal with low oxide volatility may be used as an anti-oxidation film. It suffices if the melting point of a metal used as an anti-oxidation film is higher than the temperature used in the manufacturing process for the optical module. The melting point is preferably 1,200° C. or higher. Furthermore, another silicon-based material such as silicon carbide may be used as an anti-oxidation film.

According to the fourth embodiment shown in FIGS. 14A to 18, an anti-oxidation film is formed first on the upper surface of a region of a silicon layer which serves as a core, and the core is then oxidized, thereby preventing the upper surface of the core from being oxidized. This makes it possible to selectively oxidize only the side wall portions of the core and planarize them. As a consequence, the silicon layer need not be formed thicker by an amount corresponding to the amount of oxidation in advance. There is therefore no need to use an SOI substrate having an upper silicon layer which is thicker than the core to be formed finally. This facilitates the management of substrates. In addition, since the aspect ratio of a silicon pattern before oxidation can be reduced, the degree of margin for pattern formation can be increased. As a consequence, in manufacturing an optical module, a pattern can be formed by using an inexpensive lithography system with an increased degree of manufacturing margin.

In addition, an anti-oxidation film is formed first on the upper surface of a region of a silicon layer which serves as a tapered portion, and the tapered portion is then oxidized, thereby preventing the upper surface of the tapered portion from being oxidized. This makes it possible to selectively oxidize only the side wall portions of the tapered portion and planarize them. As a consequence, the silicon layer need not be formed thicker by an amount corresponding to the amount of oxidation in advance. This facilitates the management of substrates. In addition, since the degree of margin for pattern formation increases, a pattern can be formed by using an inexpensive lithography system with an increased degree of manufacturing margin.

Furthermore, increasing the refractive index of a silicon oxide film, formed in an oxidation step, within a smaller range than that of silicon further ensures optical connection between the first optical waveguide and the second optical waveguide larger in mode field than the first optical waveguide.

(Fifth Embodiment)

This embodiment is a modification of the manufacturing method for the optical module shown in FIGS. 4A to 4H, and exemplifies only the part of the method, in particular, in which after a silicon layer serving as the first core is formed on an under cladding, the second core and an over cladding that covers it are formed.

Figure 19A:
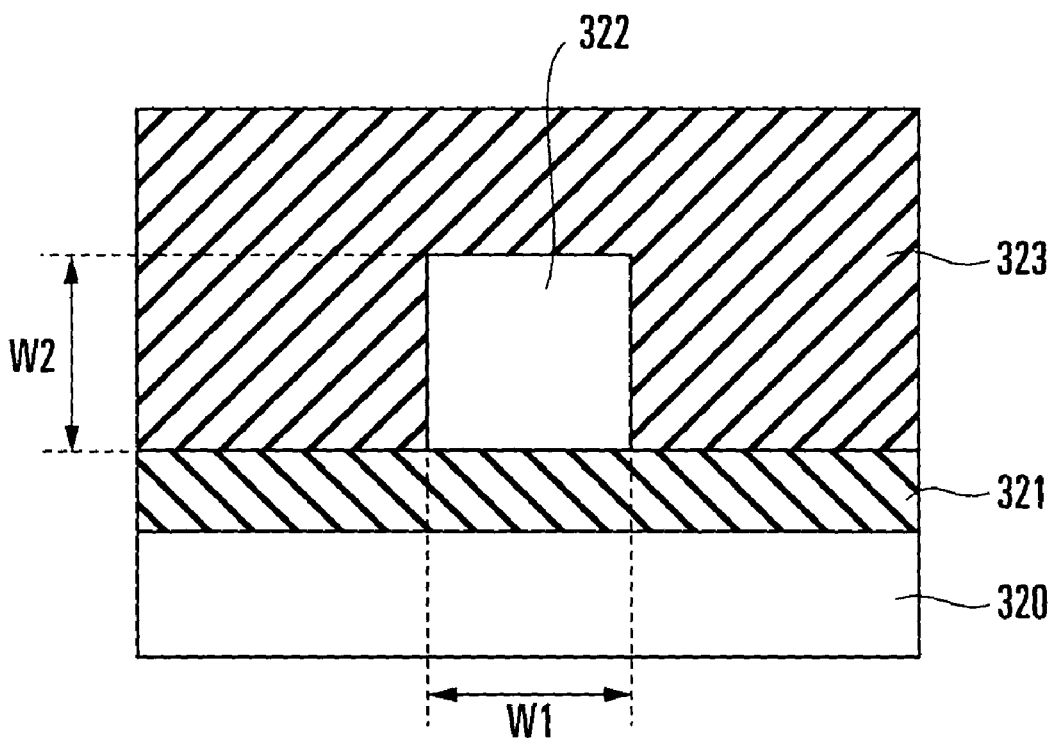
Figure 19B:
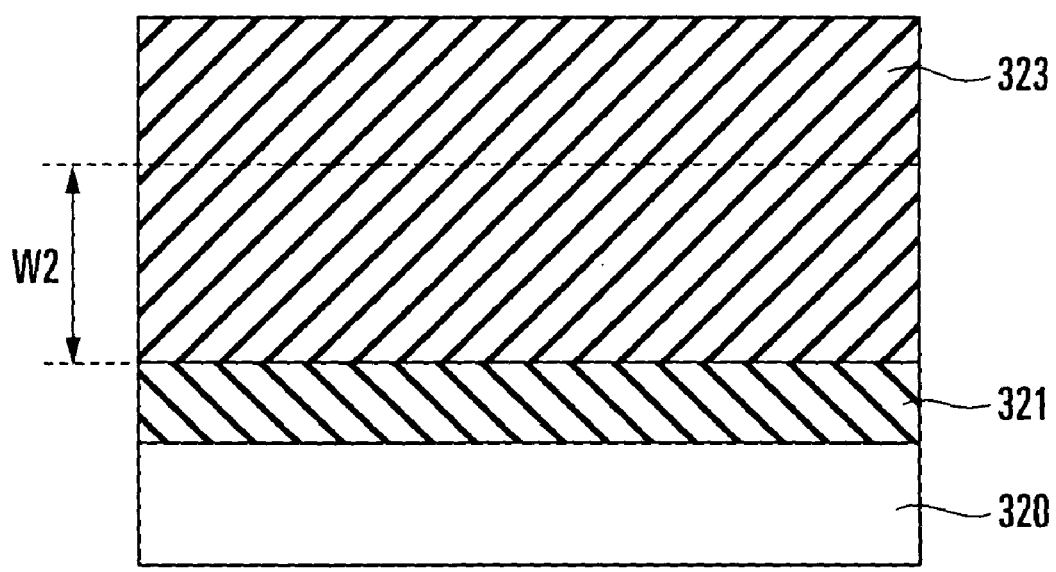

FIGS. 19A and 19B show still another embodiment of the present invention. Referring to FIGS. 19A and 19B, reference numeral 320 denotes a silicon substrate; 321, an under cladding which is flat-shaped as a whole and formed from a silicon oxide film; 322, the second core of the second optical waveguide having an almost quadrangular cross section, which is made of a polymer such as epoxy resin or polyimide; and 323, a polymer film made of epoxy resin, polyimide, or the like. Reference symbol w1 denotes the width of the second core 322; and w2, the thickness of the second core 322. The under cladding 321 has a thickness of 3 μm. The silicon substrate 320 and under cladding 321 are portions of the SOI substrate.

In the fifth embodiment, the second core 322, under cladding 321, and over cladding 323 have refractive indices of 1.5, 1.46, and 1.49, respectively. The specific refractive index differences between the second core 322 and the under cladding 321 and between the second core 322 and the over cladding 323 are 2.7% and 0.7%, respectively. If the specific refractive index difference between the second core 322 and the under cladding 321 is 1% or less as is usual, guided light leaks into the substrate 320 through the under cladding 321. This specific refractive index difference is therefore preferably set to 1% or more or 1.5% or more.

The problem of the leakage of guided light into the substrate 320 can be avoided by controlling the width and height of a cross section of the second core 322. For example, the width w1 and height w2 of a cross section of the under cladding 321 are preferably set to values within the range of 5.5 to 9 μm, and more preferably set to the same value. In this embodiment, both the width w1 and height w2 of the second core 322 are set to 7 μm.

Figure 20:
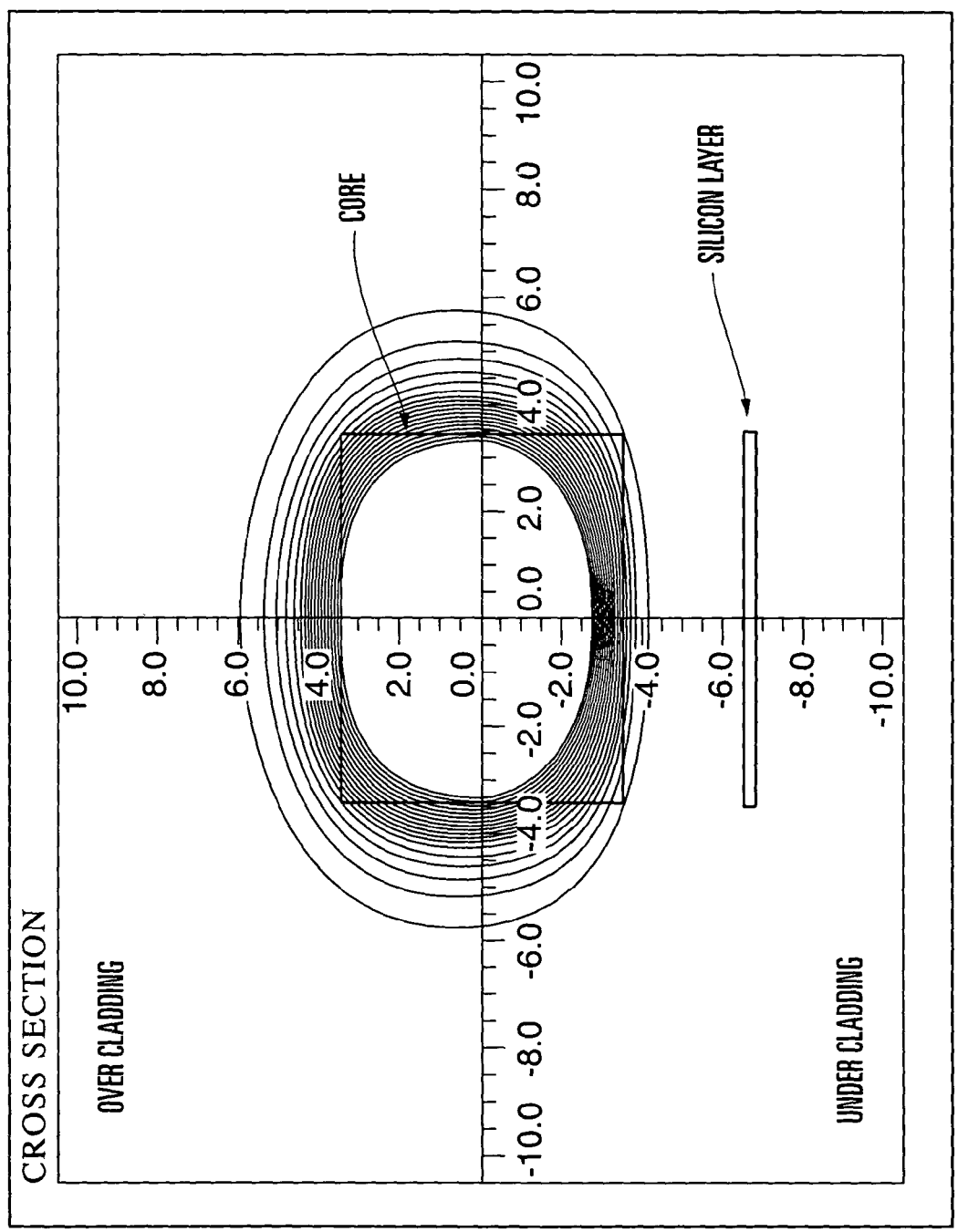
FIG. 20 is a cross-sectional light intensity distribution in the fifth embodiment.

FIG. 20 shows a light intensity distribution in the form of a mode solver after 1.55-μm TM-polarized light is caused to strike an optical waveguide having the sectional structure of the fifth embodiment and propagate by 100 μm.

As is obvious from FIG. 20, no light propagates in the silicon layer, and leakage of light into the silicon substrate is prevented while an almost circuit mode profile of 7 μm or more is held.

The above arrangement using the material having a higher refractive index than the under cladding for the over cladding can prevent guided light from leaking into the substrate 320. In addition, the single mode condition for guided light is satisfied, and a mode field diameter with a size necessary for efficient connection to a signal-mode fiber can be realized.

As described above, according to the fifth embodiment shown in FIGS. 19A to 20, even if a silicon oxide film of an SOI substrate is used as an under cladding, efficient coupling to a signal-mode fiber having a mode field diameter of about 9 µm, which is generally used, can be realized while guided light is kept in the single mode, and irradiation of the silicon substrate with light is prevented.

The polymer film 323 formed in the fifth embodiment described above can also be used as an over cladding surrounding the first core of the first optical waveguide.

(Sixth Embodiment)

Figure 21A:
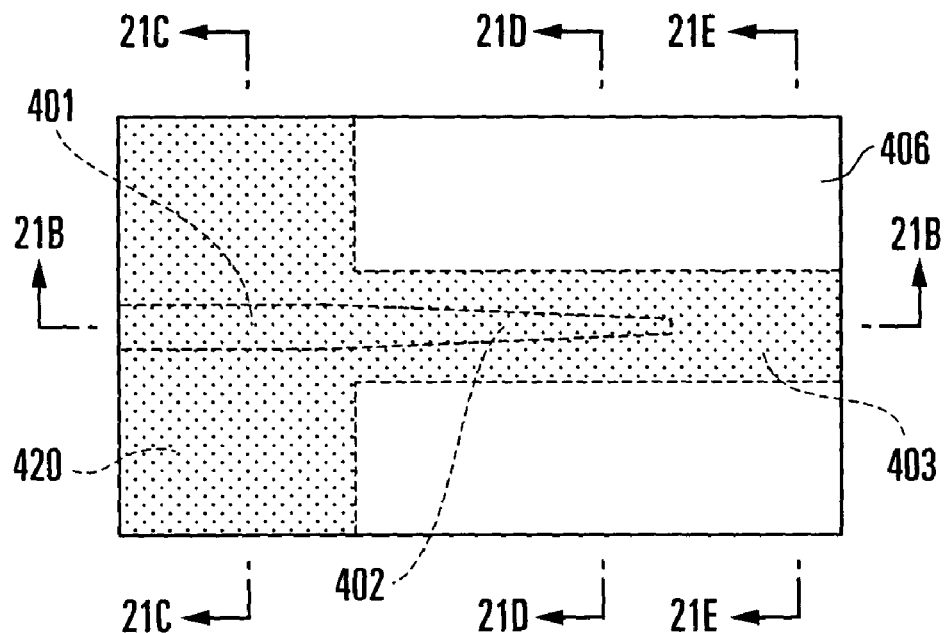
Figure 21B:
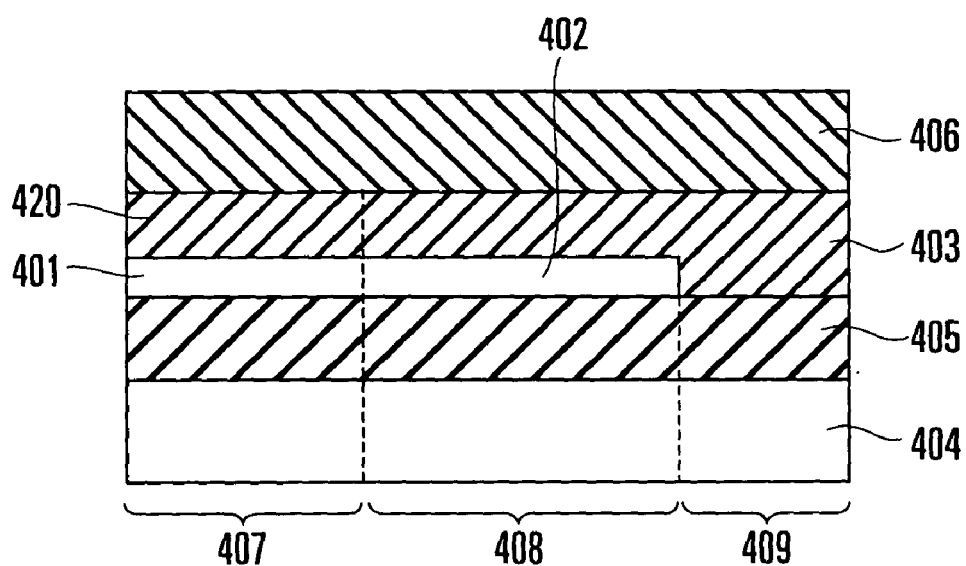
Figure 21C:
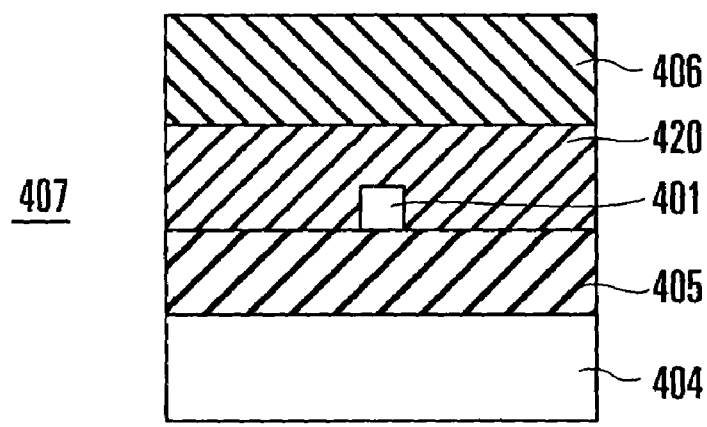
Figure 21D:
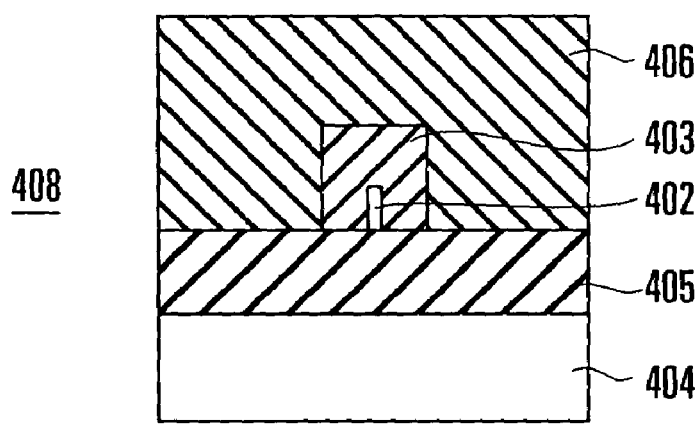
Figure 21E:
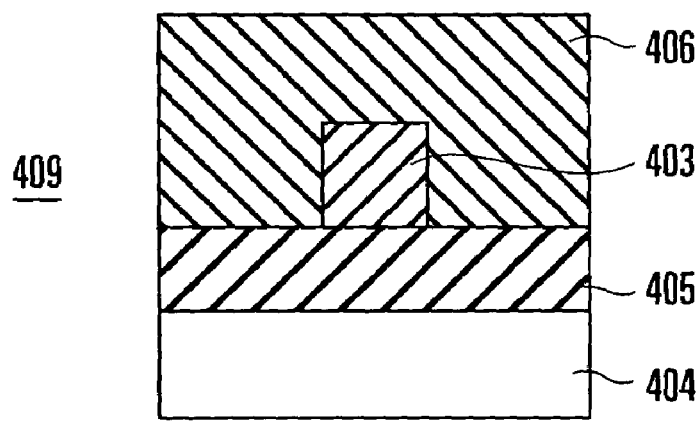

FIGS. 21A to 21E show still another embodiment of the present invention. The optical module shown in FIGS. 21A to 21E is comprised of a first optical waveguide 407 formed from a silicon wire, a mode field size (spot size) conversion portion 408 for connecting the optical waveguide 407 to an optical fiber with high efficiency; and a second optical waveguide 409 connected to the optical waveguide 407 through the mode field size conversion portion 408. These components are formed an under cladding layer 405 made of thermal silicon oxide and formed on a silicon substrate 404. Note that FIGS. 21C to 21E show cross sections of the first optical waveguide 407 formed from a silicon wire, the mode field size conversion portion 408, and the second optical waveguide 409.

The first optical waveguide 407 is constituted by the under cladding layer 405 made of 3-µm thick thermal silicon oxide (refractive index: 1.45) and formed on the silicon substrate 404, a first core 401 made of silicon with a width of 0.3 µm to 0.5 µm and a thickness of 0.2 µm to 0.4 µm and formed on the under cladding layer 405, an over cladding layer 420 which is made of a polymer having a refractive index of 1.50 and covers the core 401, and an over cladding layer 406 which is made of a polymer having a refractive index of 1.46 and formed on the over cladding layer 420.

The mode field size conversion portion 408 is constituted by the under cladding layer 405, a tapered portion 402 which is made of silicon and formed on the under cladding layer 405 such that the width of the distal end (on the optical waveguide 409 side) becomes 60 nm while the thicknesses of the under cladding layer 405 and core 401 are maintained, a second core 403 which is made of a polymer having a refractive index of 1.50, has a square cross section 3 to 5 µm square, and is formed to cover the tapered portion 402, and the over cladding layer 406 covering the second core 403. The tapered portion 402 has a length of about 300 µm.

The optical waveguide 409 is constituted by the under cladding layer 405, the core 403 which has a refractive index of 1.50 and a square cross section 3 to 5 µm square, and is formed on the under cladding layer 405, and the over cladding layer 406 covering the core 403.

The propagation state of light in the optical module of the sixth embodiment will be described next.

Light incident from the left end face of the first core 401 of the first optical waveguide shown in FIGS. 21A and 21B propagates through the core 401 and reaches the left end position of the tapered portion 402. As the light propagates through the tapered portion 402 to the right in FIG. 21A, the core width gradually decreases, and the confinement of the light weakens. As a result, the mode field tries to spread circumferentially. At this time, however, since the second core 403 higher in refractive index than the under cladding 405 exists adjacent to the tapered portion 402, the optical power distribution gradually shifts from the first core 401 to the second core 403.

In contrast to the above case, when light is incident from the right end portion of the second core 403 shown in FIGS. 21A and 21B, the light distribution moves to the first core 401 through the second core 403 and tapered portion 402 as the light travels from the right to the left. As described above, since the first optical waveguide 407 is made to have the mode field size conversion portion 408 and second optical waveguide 409 for connection to an optical fiber, light can be input/output to/from the first optical waveguide 407 having a small field size with high efficiency.

In the optical module according to the sixth embodiment described above, the same polymer material is used for the over cladding layer 420 of the first optical waveguide 407, the core 403 of the mode field size conversion portion 408, and the core 403 of the second optical waveguide 409, and hence the tapered portion 402 of the first optical waveguide 407, the core 403 of the mode field size conversion portion 408, and the second core 403 of the second optical waveguide 409 can be formed at the same time. This facilitates the formation of these components.

The same material as that used for the mode field size conversion portion 408 and the second core 403 of the second optical waveguide 409 is used for the over cladding layer 420 of the first optical waveguide 407. For this reason, in forming the second core 403 by processing the polymer material, it suffices if the polymer material in the region of the first optical waveguide 407 is left without being etched. This prevents the first core 401 from being damaged in the process of forming the second core 403. In addition, since the surface of the core 401 is not exposed to plasma, there is no need to consider the etching selectively ratio between the material for the second core 403 and silicon, thus facilitating etching.

In addition, by forming the over cladding layer 406 on the mode field size conversion portion and second optical waveguide, the size of the second core of the second optical waveguide which satisfies the single mode condition can be increased as compared with the conventional case wherein air serves as an over cladding. As a consequence, the connection loss with respect to an optical fiber can be reduced.

Note that the side surfaces and upper surface of the first core 401 of the first optical waveguide 407 are surrounded with the over cladding layer 420 higher in refractive index than the under cladding layer 405 by about 3%. However, since both the refractive index difference between silicon having a refractive index of 3.5 and the under cladding layer 405 and between silicon and the over cladding layer 420 are large, there is no influence on the light confinement characteristics of the first optical waveguide 407, bend loss, and propagation loss.

In the sixth embodiment, a polymer having a refractive index of 1.50 is used as a material for the over cladding layer 420 of the first optical waveguide 407, the core 403 of the mode field size conversion portion 408, and the second core 403 of the second optical waveguide 409. It, however, suffices if this refractive index is higher than that of thermal silicon oxide ($SiO_2$) used for the under cladding layer 405 and lower than that of silicon used for the tapered portion 402 continuous with the first core 401. An inorganic material such as silicon oxide or silicon-oxynitride (SiON) can be used as a material for the over cladding layer 420 and second core 403 as well as a polymer such as epoxy or polyimide as long as the refractive index can be changed within a certain range by, for example, a technique such as doping.

In the sixth embodiment, a polymer having a refractive index of 1.46 is used as a material for the over cladding layer 406. It, however, suffices if this refractive index is lower than that of a material used for the second core 403 of the second optical waveguide 409. An inorganic material such as $SiO_2$ or SiON can be used as a material for the over cladding layer 406 as well as a polymer such as epoxy or polyimide as long as the refractive index can be changed within a certain range by, for example, a technique such as doping.

(Seventh Embodiment)

A manufacturing method will be described next by taking an optical waveguide as an example, which is a basic unit of an optical module according to the present invention.

Figure 22:
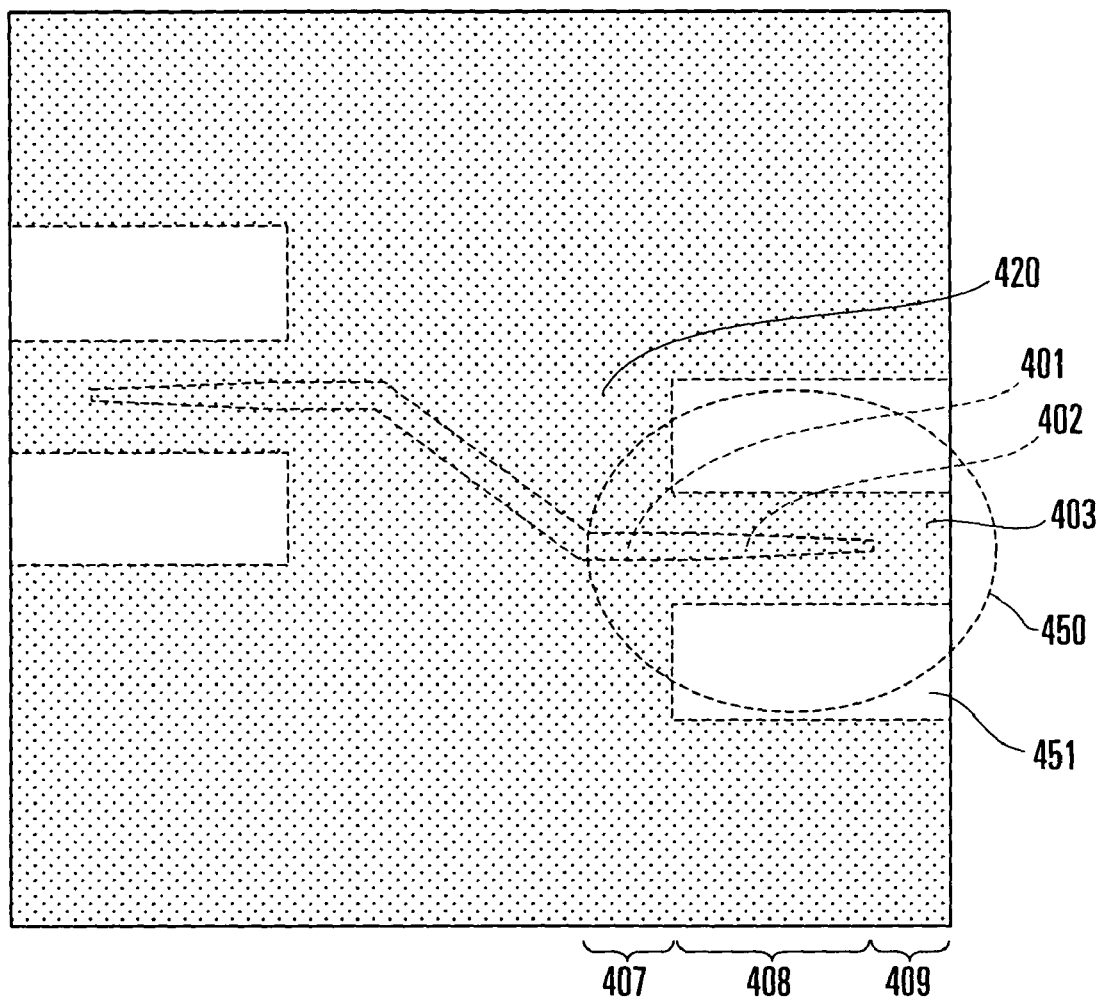
FIG. 22 is a plan view showing an optical module according to the seventh embodiment of the present invention.

FIG. 22 shows still another embodiment of the present invention. The same reference numerals as in FIGS. 21A to 21E denote the same parts in FIG. 22. A region 450 in FIG. 22 corresponds to the optical module described in the sixth embodiment. Reference numeral 451 denotes an etching region.

FIGS. 23A to 23H show a manufacturing method for the optical module shown in FIG. 22.

The optical module using silicon for a core which transmits light uses an SOI (Silicon On Insulator) substrate. The SOI substrate is constituted by a silicon substrate 404, a 3-μm thick under cladding layer 405 made of silicon oxide and formed on the silicon substrate 404, and a silicon layer 411 which has a thickness of 0.2 μm to 0.5 μm and is formed on the under cladding layer 405.

Figure 23A:
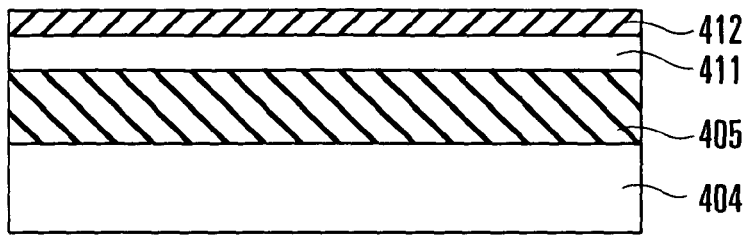
Figure 23B:
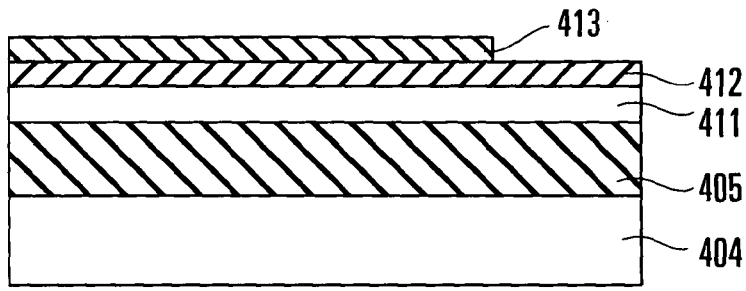

First of all, a mask material 412 made of silicon oxide or the like which serves as an etching mask for the silicon layer 411 is formed on the SOI substrate by using a film formation method such as CVD (FIG. 23A). The upper surface of the mask material 412 is then coated with a resist, and a desired resist pattern 413 is formed by using lithography such as electron beam lithography or photolithography (FIG. 23B).

Figure 23C:
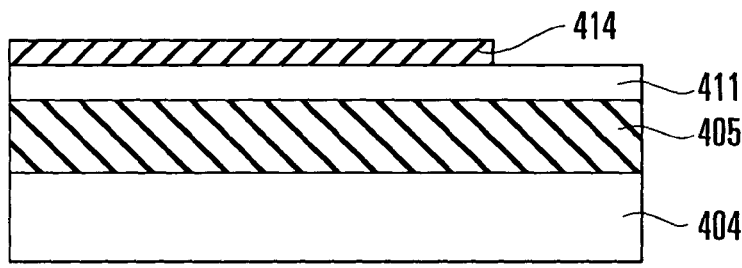
Figure 23D:
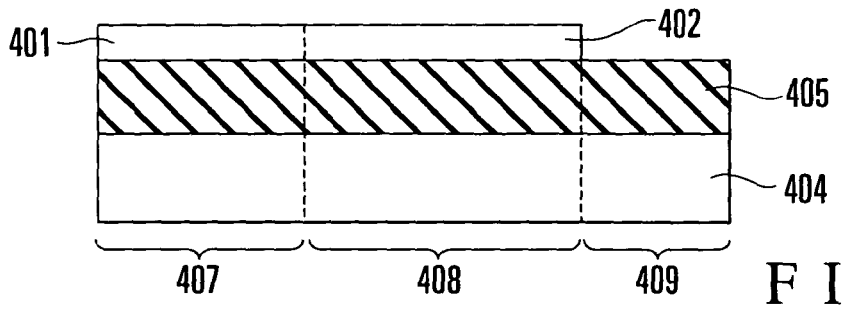

Subsequently, an etching mask 414 is formed by dry-etching the mask material 412 using the resist pattern 413 as a mask, and the resist pattern 413 is then removed (FIG. 23C). The silicon layer 411 is etched by using the etching mask 414 as a mask to form a first core 401 of a first optical waveguide 407, which is made of silicon, and a tapered portion 402 of a mode field size conversion portion 408. Thereafter, the etching mask 414 is removed by using an etching solution (FIG. 23D).

In this manner, the circuit pattern of the optical module having the first core 401 and tapered portion 402 is formed on the under cladding layer 405. The tapered portion 402 at the light input/output portion of an end of this circuit pattern is formed such that the width dimension gradually decreases toward the distal end (corresponding to the optical waveguide 409 side in FIG. 21B) while the height of a cross section (thickness) of the first core 401 is maintained. The distal end portion has a width of 50 to 80 nm.

Figure 23E:
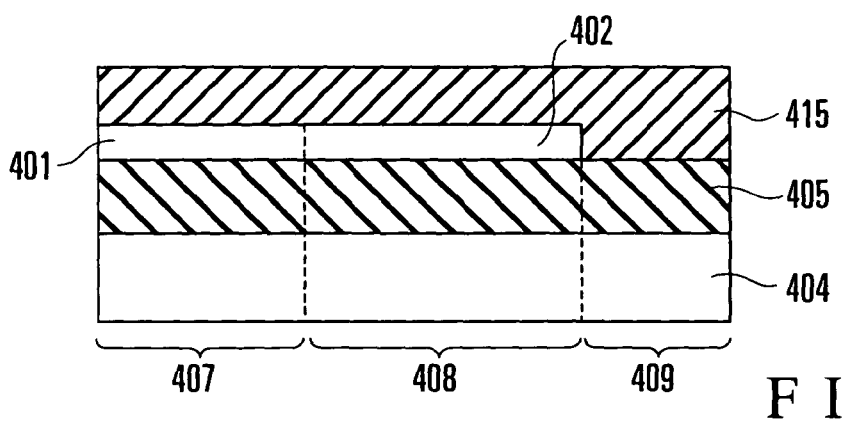

A 3-μm thick silicon oxide film 415 which becomes the core of the mode field size conversion portion 408 and the core of the second optical waveguide 409 is deposited on the SOI substrate, on which the circuit pattern of the optical module is formed, by CVD or the like (FIG. 23E). The silicon oxide film 415 is doped with germanium or the like so as to have a refractive index higher than that of the silicon oxide film of the under cladding layer 405 by 2 to 3%.

After the upper surface of the silicon oxide film 415 is coated with a photoresist, the resist is processed by photolithography to form a pyriform resist pattern 416 in FIG. 22 which overlays the core 401 and tapered portion 402 (FIG. 23F).

The silicon oxide film 415 is then etched by using the resist pattern 416 as a mask to form an over cladding layer 420 of the first optical waveguide 407, the core 403 of the mode field size conversion portion 408, and a core 403 of the second optical waveguide 409. Thereafter, the resist pattern 416 is removed (FIG. 23G).

Finally, an over cladding layer 406 which has a thickness of 3 μm or more and is formed from a silicon oxide film lower in refractive index than the second core 403 is deposited on the entire surface of the SOI wafer (FIG. 23H). By cutting the SOI wafer at the second optical waveguide 409 by dicing or the like, an optical module having the mode field size conversion portion 408 and second optical waveguide 409 which allows efficient connection to an optical fiber is completed.

In the seventh embodiment, as shown in FIG. 22, the resist pattern 416 is designed in advance such that the two regions which are symmetrical with respect to the traveling direction of light in the second core 403 (the lateral direction in FIG. 22) are set as the etching regions 451 to remove the silicon oxide film 415 while the silicon oxide film 415 in the remaining regions is left without being etched. Since this prevents the first core 401 from being exposed to plasma at the time of etching of the silicon oxide film 415, damage to the first core 401 can be avoided. In addition, since the etching area of the silicon oxide film 415 can be greatly reduced, no special attention needs to be paid to etching of the silicon oxide film 415. This facilitates etching.

Note that the minimum width of the etching region 451 varies depending on the size of the second core 403 and the thickness of the under cladding layer 405. In the seventh embodiment, since the second core 403 is 3 μm square in cross section and the under cladding layer 405 has a thickness of 3 μm, the minimum width of the etching region 451 in FIG. 22 becomes 3 μm. This is because, if the width of the etching region 451 becomes smaller than 3 μm, coupling occurs between the second core 403 and the silicon oxide film 415 which are adjacent to each other through the etching region 451, and light leaks from the second core 403.

In the seventh embodiment, silicon oxide is used as a material for the over cladding layer 420 of the first optical waveguide 407, the core 403 of the mode field size conversion portion 408, and the second core 403 of the second optical waveguide 409. As described in the sixth embodiment, however, a polymer such as polyimide or epoxy or silicon-oxynitride may be used.

(Eighth Embodiment)

Still another embodiment of the present invention will be described next with reference to FIGS. 24A to 24C. The same reference numerals as in FIGS. 21A to 21E denote the same part in FIGS. 24A to 24C.

Figure 24A:
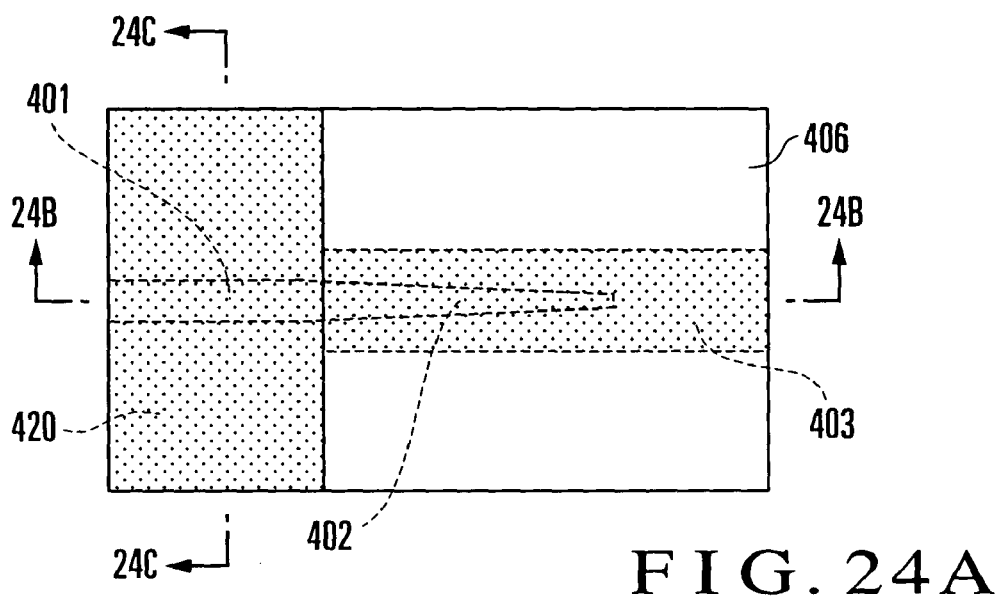
Figure 24B:
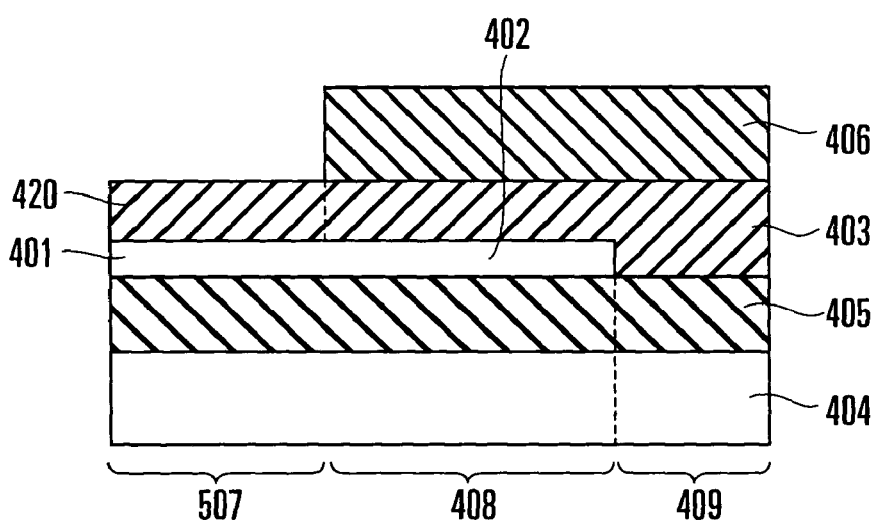
Figure 24C:
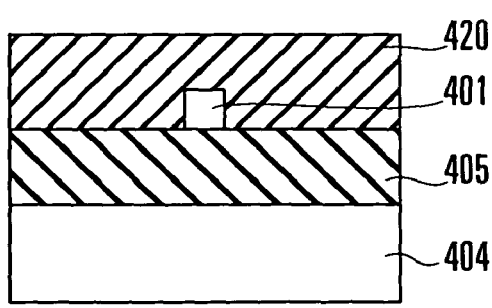
Figure 25:
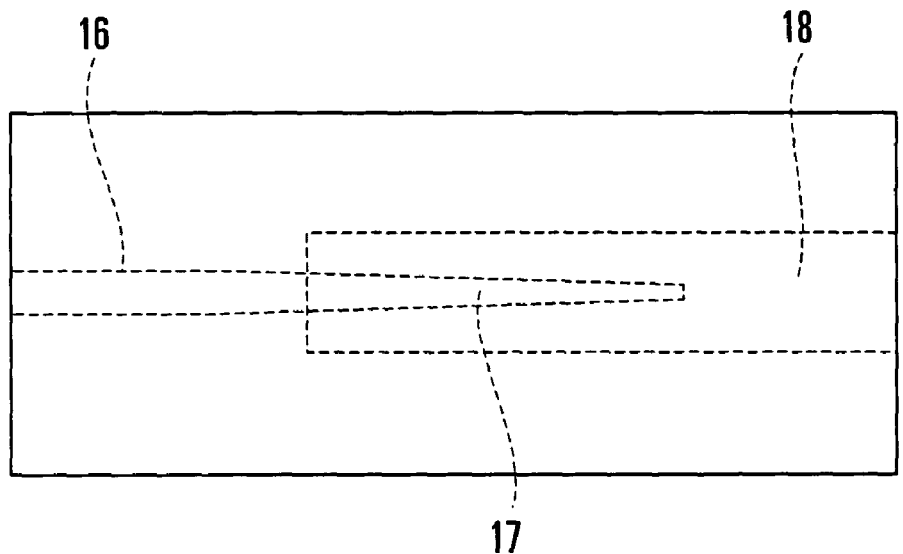
Figure 25:
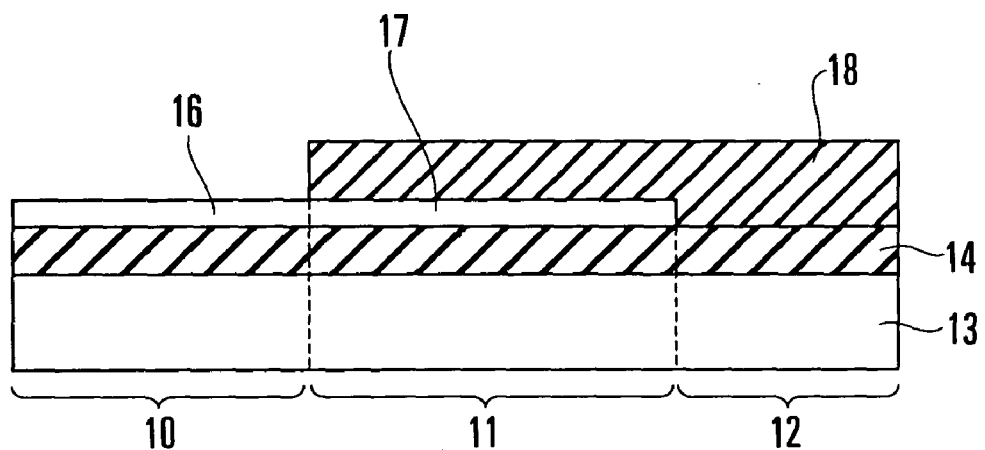

Referring to FIGS. 24A to 24C, the over cladding layer of a first optical waveguide 507 formed from a silicon wire is formed as a single layer using an over cladding layer 420 made of the same material as that for a core 403 of a mode field size conversion portion 408 and a core 403 of a second optical waveguide 409. Since the core 403 has a square cross section 3 to 5 μm square, the thickness of the over cladding layer 420 becomes 3 to 5 μm, which is a sufficient thickness for the over cladding of the first optical waveguide.

Since the same material as that for the core 403 of the mode field size conversion portion 408 and the core 403 of the second optical waveguide 409 is used for the over cladding layer 420, the refractive index of the over cladding layer 420 is higher than that of an under cladding layer 405. However, both the refractive index differences between silicon with a refractive index of 3.5 and the under cladding layer 405 and between silicon and the over cladding layer 420 are very large, and hence there is no influence on the light confinement characteristics of the first optical waveguide 507, bend loss, and propagation loss.

When the over cladding layer of the first optical waveguide 507 is formed as a single layer as in the eighth embodiment, the thickness of the over cladding layer can be reduced as compared with a case wherein the over cladding layer is constituted by two layers as in the sixth and seventh embodiments. As a consequence, when a heater is placed above a core 401 made of silicon to heat it as in a case with a thermal switch, since the thermal conductivity to the first core 401 of the first optical waveguide 507 improves, the power consumption can be reduced.

The optical module shown in FIGS. 24A to 24C can be easily manufactured by etching the over cladding layer 406 in the region of the first optical waveguide 507 while an over cladding layer 406 in the regions of the mode field size conversion portion 408 and second optical waveguide 409 is masked or preventing deposition of a film 415 on the first optical waveguide by using a stencil mask or the like when the film 415 serving as the core 403 is formed (FIG. 23E), after the step in FIG. 22H described in the seventh embodiment.

According to the sixth to eighth embodiments shown in FIGS. 21A to 21E, 22, 23A to 23H, and 24A to 24C, by using the same material for the first over cladding of the first optical waveguide and the second core of the second optical waveguide, the first over cladding of the first optical waveguide and the second core of the second optical waveguide can be simultaneously formed, thereby facilitating formation of the components. Since the same material is used for the first over cladding layer of the first optical waveguide and the second core of the second optical waveguide, when the material is processed to form the second core, the material in the region of the first optical waveguide can be left without being etched. This prevents the surface of the first core from being exposed to plasma. Therefore, no damage is caused to the first core in the process of forming the second core. In addition, since the surface of the first core is not exposed to plasma, there is no need to consider the etching selectively ratio between the material for the second core and silicon, thus facilitating etching. As a consequence, a mode field size conversion structure and a second optical waveguide which are used for efficient connection to an optical fiber can be easily formed in a light input/output portion simultaneously with the first optical waveguide without causing any damage to the first core of the first optical waveguide.

According to the sixth to eighth embodiments, by covering the mode field size conversion portion and second optical waveguide with the over cladding layer having a refractive index similar to that of the under cladding, the core size of the second optical waveguide can be increased. This can reduce the connection loss with respect to an optical fiber.

In addition, the over cladding of the first optical waveguide can be thinned by integrally coupling the over cladding of the first optical waveguide to the second core of the second optical waveguide and using the same material as that for the second core for the over cladding. As a consequence, when a heater is placed above the first core to heat it as in a case with a thermal switch, since the thermal conductivity to the first core improves, the power consumption can be reduced.

In addition, the two regions which are symmetrical with respect to the traveling direction of light in the second core are removed to form the second core. This makes it possible to greatly reduce the etching area of the core material. Therefore, no special attention needs to be paid to etching of the core material. This facilitates etching.

In the sixth to eighth embodiments shown in FIGS. 21A to 21E, 22, 23A to 23H, and 24A to 24C, the over cladding layer 406 is formed. However, since the layer 420 exists as an over cladding layer on the first core of the first optical waveguide 407 or 507, the over cladding layer 406 is not specially required. With such an arrangement, the same effects as those of the sixth to eighth embodiments can be obtained.

Although not specifically described, in the sixth to eighth embodiments, the first core may be surrounded with an oxide film as in the first and second embodiments.

Each embodiment described above has exemplified the case wherein a silicon oxide film is used as an under cladding. Obviously, however, the same effects as described above can also be obtained by using a silicon nitride film or quarts.

In each embodiment described above, a silicon substrate is used as a substrate. However, a substrate made of another material such as glass or quartz can be used in place of a silicon substrate. An optical module according to the present invention may be formed on a multilayer substrate.

In each embodiment described above, the first and second cores connected to the input/output side of the mode field size conversion portion differ in mode field size. It, however, should be noticed that in practice, this difference is equivalent to a difference in cross-sectional area or cross-sectional shape between the respective cores.

What is claimed is:

1. An optical module comprising:
   an under cladding having a flat shape as a whole;
   a first core which has a quadrangular cross section and is placed on said under cladding;
   a second core placed on a terminal end portion of said first core and completely covering said terminal end portion; and
   an over cladding placed in a region including the terminal end portion of said first core and said second core placed on the terminal end portion of said first core,
   wherein said under cladding and said first core placed thereon constitute a first optical waveguide,
   said under cladding, the terminal end portion of said first core placed on said under cladding, said second core placed thereon, and said over cladding placed on and around said second core constitute a mode field size conversion portion,
   said under cladding, said second core placed on said under cladding, and said over cladding placed on and around said second core constitute a second optical waveguide,
   said first core is made of silicon,
   said second core is made of a material higher in refractive index than said under cladding and lower in refractive index than silicon of said first core and the terminal end portion,
   said first and second cores differ in cross-sectional shape,
   a refractive index of said over cladding is higher than that of said under cladding, and
   a specific refractive index difference between said second core and said under cladding is larger than that between said second core and said over cladding.

2. A module according to claim 1 wherein the under cladding is placed on a silicon-on-insulator (SOI) substrate.

3. A module according to claim 1, wherein the terminal end portion is formed from a tapered portion whose cross-sectional area gradually decreases toward a distal end thereof.

4. A module according to claim 1, wherein said over cladding is placed on and around said second core on said under cladding constituting the second optical waveguide and said second core on the terminal end portion constituting the mode field size conversion portion, and on said first core constituting the first optical waveguide.

5. A module according to claim 1, wherein said under cladding is formed on a silicon substrate.

6. A module according to claim 1, wherein said first core and at least a side portion of the terminal end portion are covered with a silicon oxide film.

7. A module according to claim 6, wherein said second core on the terminal end portion is placed on the silicon oxide film.

8. A module according to claim 1, wherein said second core covers a substantially entire region on an upper surface of the terminal end portion.

9. A module according to claim 1, wherein said under cladding is formed from a silicon oxide film.

10. A module according to claim 1, wherein said under cladding is formed on a substrate.

11. A module according to claim 4, wherein said over cladding placed on said core of the first optical waveguide is continuous with said second core of the second optical waveguide, and said over cladding and said second core are made of the same material.

12. A module according to claim 11, wherein a second over cladding is placed on said over cladding placed on said core of the first optical waveguide and said second core of said second optical waveguide continuous with said over cladding, and said second over cladding is lower in refractive index than said second core.

13. A module according to claim 11, further comprising regions where the material for said second core does not exist at two positions symmetrical with respect to a traveling direction of light in said second core.

* * * * *